US011165052B2

(12) United States Patent
Xiao et al.

(10) Patent No.: US 11,165,052 B2
(45) Date of Patent: Nov. 2, 2021

(54) LITHIUM ALLOY-BASED ELECTRODES FOR ELECTROCHEMICAL CELLS AND METHODS FOR MAKING THE SAME

(71) Applicant: GM GLOBAL TECHNOLOGY OPERATIONS LLC, Detroit, MI (US)

(72) Inventors: Xingcheng Xiao, Troy, MI (US); Jin Liu, Sterling Heights, MI (US); Mei Cai, Bloomfield Hills, MI (US); Meinan He, Sterling Heights, MI (US); Hongliang Wang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 16/514,633

(22) Filed: Jul. 17, 2019

(65) Prior Publication Data
US 2021/0020912 A1 Jan. 21, 2021

(51) Int. Cl.
*H01M 4/1391* (2010.01)
*H01M 10/0525* (2010.01)
(Continued)

(52) U.S. Cl.
CPC ....... *H01M 4/1391* (2013.01); *H01M 4/0452* (2013.01); *H01M 4/134* (2013.01);
(Continued)

(58) Field of Classification Search
CPC ......... H01M 10/0525; H01M 10/0567; H01M 2004/027; H01M 2300/0028;
(Continued)

(56) References Cited

U.S. PATENT DOCUMENTS 8,974,946 B2 3/2015 Cai et al.
9,160,036 B2 10/2015 Yang et al.
(Continued)

FOREIGN PATENT DOCUMENTS

CN 112242552 A 1/2021

*Primary Examiner* — Victoria H Lynch
(74) *Attorney, Agent, or Firm* — Harness, Dickey & Pierce, P.L.C.

(57) ABSTRACT

A negative electrode according to various aspects of the present disclosure includes a negative electroactive material and a layer. The negative electroactive material includes a lithium-aluminum alloy. The layer is disposed directly on at least a portion of the negative electroactive material and coupled to the negative electroactive material. The layer includes anodic aluminum oxide and has a plurality of pores. The present disclosure also provides an electrochemical cell including the negative electrode. In certain aspects, the negative electroactive material is electrically conductive and functions as a negative electrode current collector such that the electrochemical cell is free of a distinct negative electrode current collector component. In certain aspects, the layer is ionically conductive and electrically insulating and functions as a separator such that the electrochemical cell is free of a distinct separator component. In various aspects, the present disclosure also provides a method of making the negative electrode.

16 Claims, 11 Drawing Sheets

(51) Int. Cl.
  *H01M 10/0567* (2010.01)
  *H01M 4/62* (2006.01)
  *H01M 4/36* (2006.01)
  *H01M 4/1395* (2010.01)
  *H01M 4/04* (2006.01)
  *H01M 4/134* (2010.01)
  *H01M 4/02* (2006.01)

(52) U.S. Cl.
  CPC ......... *H01M 4/1395* (2013.01); *H01M 4/366* (2013.01); *H01M 4/621* (2013.01); *H01M 10/0525* (2013.01); *H01M 10/0567* (2013.01); *H01M 2004/027* (2013.01); *H01M 2300/0028* (2013.01); *H01M 2300/0065* (2013.01)

(58) Field of Classification Search
  CPC ....... H01M 2300/0065; H01M 4/0452; H01M 4/134; H01M 4/1391; H01M 4/1395; H01M 4/366; H01M 4/621
  See application file for complete search history.

(56) References Cited

U.S. PATENT DOCUMENTS

| | | | |
|---|---|---|---|
| 9,252,411 B2 | 2/2016 | Abd Elhamid et al. | |
| 9,373,829 B2 | 6/2016 | Xiao et al. | |
| 9,647,254 B2 | 5/2017 | Dadheech et al. | |
| 9,742,028 B2 | 8/2017 | Zhou et al. | |
| 9,923,189 B2 | 3/2018 | Xiao | |
| 9,929,435 B2 | 3/2018 | Cai et al. | |
| 9,979,008 B2 | 5/2018 | Dai et al. | |
| 10,084,204 B2 | 9/2018 | Dai et al. | |
| 10,128,481 B2 | 11/2018 | Xiao et al. | |
| 10,199,643 B2 | 2/2019 | Zhou et al. | |
| 10,224,571 B2 | 3/2019 | Yang et al. | |
| 10,434,894 B2 | 10/2019 | Li et al. | |
| 10,673,046 B2 | 6/2020 | Dadheech et al. | |
| 10,749,214 B2 | 8/2020 | Salvador et al. | |
| 10,751,694 B2 | 8/2020 | Dailly et al. | |
| 10,814,743 B2 | 10/2020 | Li et al. | |
| 2014/0170465 A1* | 6/2014 | Visco | H01M 50/46 429/144 |
| 2015/0056387 A1 | 2/2015 | Dadheech et al. | |
| 2015/0056493 A1 | 2/2015 | Dadheech et al. | |
| 2015/0349307 A1 | 12/2015 | Dadheech et al. | |
| 2016/0172681 A1 | 6/2016 | Yang et al. | |
| 2016/0172706 A1 | 6/2016 | Xiao et al. | |
| 2016/0172710 A1 | 6/2016 | Liu et al. | |
| 2016/0240831 A1* | 8/2016 | Zeng | H01M 10/052 |
| 2017/0162859 A1 | 6/2017 | Yang et al. | |
| 2017/0214079 A1 | 7/2017 | Dai et al. | |
| 2017/0271678 A1 | 9/2017 | Yang et al. | |
| 2017/0288230 A1 | 10/2017 | Yang et al. | |
| 2017/0338490 A1 | 11/2017 | Xiao et al. | |
| 2018/0010895 A1 | 1/2018 | Faxon | |
| 2018/0048022 A1 | 2/2018 | Yang et al. | |
| 2018/0309165 A1 | 10/2018 | Yersak et al. | |
| 2018/0309166 A1 | 10/2018 | Yersak et al. | |
| 2018/0375148 A1 | 12/2018 | Yersak et al. | |
| 2019/0044134 A1 | 2/2019 | Liu et al. | |
| 2019/0058210 A1 | 2/2019 | Dai et al. | |
| 2019/0058211 A1 | 2/2019 | Yang et al. | |
| 2019/0058215 A1 | 2/2019 | Dai et al. | |
| 2019/0058219 A1 | 2/2019 | Yang et al. | |
| 2019/0067675 A1 | 2/2019 | Xiao | |
| 2019/0067744 A1 | 2/2019 | Xiao et al. | |
| 2019/0089006 A1 | 3/2019 | Yang et al. | |
| 2019/0165415 A1 | 5/2019 | Dai et al. | |
| 2019/0165416 A1 | 5/2019 | Dai et al. | |
| 2019/0207201 A1 | 7/2019 | Dai et al. | |
| 2019/0207205 A1 | 7/2019 | Adair et al. | |
| 2019/0207208 A1 | 7/2019 | Dai et al. | |
| 2019/0207211 A1 | 7/2019 | Dai et al. | |
| 2019/0207245 A1 | 7/2019 | Adair et al. | |
| 2019/0207261 A1 | 7/2019 | Yang et al. | |
| 2019/0226859 A1 | 7/2019 | Li et al. | |
| 2019/0312255 A1 | 10/2019 | Dai et al. | |
| 2019/0329353 A1 | 10/2019 | Dai et al. | |
| 2019/0372155 A1 | 12/2019 | Yersak et al. | |

\* cited by examiner

LITHIUM ALLOY-BASED ELECTRODES FOR ELECTROCHEMICAL CELLS AND METHODS FOR MAKING THE SAME

INTRODUCTION

This section provides background information related to the present disclosure which is not necessarily prior art.

The present disclosure relates to lithium alloy-based electrodes, electrochemical cells including the lithium-alloy based electrodes, and methods for making the same.

High-energy density electrochemical cells, such as lithium-ion batteries can be used in a variety of consumer products and vehicles, such as hybrid or electric vehicles. Battery powered vehicles show promise as a transportation option as technical advances continue to be made in battery power, lifetimes, and cost. One factor potentially limiting wider acceptance and use of battery-powered vehicles is the potentially limited driving range, especially in the earlier stages of adoption where charging stations are not yet ubiquitous as gas stations are today. It would be desirable to provide batteries capable of providing longer drive ranges and shorter charge times. In addition, battery-powered vehicles often are required to operate in extreme weather conditions, for example, at low temperatures in Northern winter weather.

In the face of these requirements, it has been a challenge to find economical battery chemistries that meet both energy and power requirements. There has long been a need for a battery having a chemistry that avoids or minimizes use of expensive metals, such as cobalt and other noble metals, while providing advantageous power delivery, long driving ranges, and fast charge to enhance widespread use of batteries, especially in vehicles.

SUMMARY

This section provides a general summary of the disclosure, and is not a comprehensive disclosure of its full scope or all of its features.

In various aspects, the present disclosure provides a negative electrode including a negative electroactive material and a layer. The negative electroactive material includes a lithium-aluminum alloy. The layer is disposed directly on at least a portion of the negative electroactive material and coupled to the negative electroactive material. The layer includes anodic aluminum oxide and has a plurality of pores.

In one aspect, the negative electroactive material defines a body. The layer includes a first layer disposed on a first side of the body and a second layer disposed on a second side of the body opposite the first side of the body.

In one aspect, the body defines a lithium concentration gradient such that a highest molar concentration of lithium is disposed in region of the body adjacent to the layer.

In one aspect, the body consists essentially of the lithium-aluminum alloy, lithium, aluminum, and an electrolyte.

In one aspect, the layer has a porosity of greater than or equal to about 20% to less than or equal to about 50%. The body has a porosity of less than or equal to about 15%.

In one aspect, the layer has a thickness of less than or equal to about 10 microns. At least a portion of the pores of the plurality of pores extend continuously through the layer to the negative electroactive material.

In one aspect, the layer further includes lithium.

In various aspects, the present disclosure provides an electrochemical cell. The electrochemical cell includes a positive electrode, a negative electrode, and an electrolyte. The positive electrode includes a positive electroactive material. The negative electrode includes a negative electroactive material and a layer. The negative electroactive material includes a lithium-aluminum alloy. The layer is disposed directly on at least a portion of the negative electroactive material and coupled to the negative electroactive material. The layer includes anodic aluminum oxide. The layer includes a plurality of pores. The layer is electrically insulating. The electrolyte is disposed between the positive electrode and the negative electrode such that a portion of the electrolyte is disposed within the plurality of pores of the layer.

In one aspect, the layer has a thickness of greater than or equal to about 5 microns. The layer is configured to function as a separator. The electrochemical cell is free of a distinct separator component.

In one aspect, the electrochemical cell further includes a polymeric membrane separator disposed between the positive electrode and the layer of the negative electrode. The polymeric membrane separator is ionically-conductive and electrically-insulating.

In one aspect, the electrolyte includes one of: (i) a salt comprising lithium perchlorate and a non-aqueous solvent; (ii) a salt comprising lithium bis(fluorosulfonyl)imide, lithium bis(trifluoromethanesulfonyl)imide, or a combination of lithium bis(fluorosulfonyl)imide and lithium bis (trifluoromethanesulfonyl)imide and an aqueous, non-aqueous, or hybrid solvent; or (iii) a salt comprising lithium hexafluorophosphate and an additive or co-solvent comprising fluoroethylene carbonate.

In one aspect, the electrochemical cell further includes a positive electrode current collector electrically connected to the positive electrode. The negative electroactive material of the negative electrode is configured to function as a negative electrode current collector. The electrochemical cell is free of a distinct negative electrode current collector component.

In one aspect, the electrolyte is present in the electrochemical cell at greater than or equal to about 10 weight percent to less than or equal to about 12 weight percent.

In various aspects, the present disclosure provides a method of making a negative electrode. The method includes providing an electrode precursor. The electrode precursor includes a metal selected from the group consisting of: aluminum, magnesium, zinc, tin, indium, any alloy thereof, or any combination thereof. The method further includes anodizing a first surface of the electrode precursor to form a layer. The layer includes a metal oxide. The method further includes lithiating at least a portion of the metal of the electrode precursor to form a negative electroactive material including a lithium-metal alloy. The layer is disposed directly on at least a portion of the negative electroactive material and coupled to the negative electroactive material.

In one aspect, the metal includes aluminum. The anodizing facilitates formation of a plurality of pores.

In one aspect, the layer is a first layer and the anodizing further includes anodizing a second surface of the electrode precursor to form a second layer including the metal oxide.

In one aspect, the metal includes aluminum and the electrode precursor consists essentially of the aluminum.

In one aspect, the electrode precursor includes a lithium-metal alloy.

In one aspect, the method further includes roughening the first surface of the electrode precursor prior to the anodizing.

In one aspect, the anodizing includes roll-to-roll processing. The lithiating includes roll-to-roll processing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
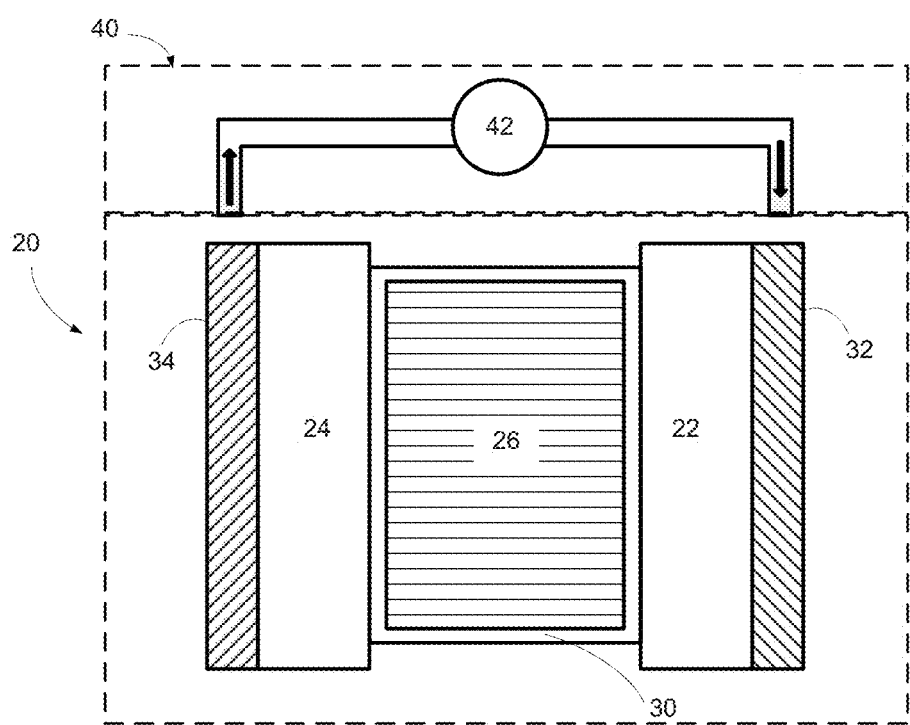
FIG. 1 is a schematic view of an electrochemical cell according to various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to rechargeable lithium-ion batteries, which may be used in vehicle applications. However, the present technology may also be used in other electrochemical devices that cycle lithium ions, such as handheld electronic devices. A rechargeable lithium-ion battery is provided that may exhibit high energy density, low capacity fade, and high Coulombic efficiency.

General Electrochemical Cell Function, Structure, and Composition

A typical electrochemical cell includes a first electrode, such as a positive electrode or cathode, a second electrode such as a negative electrode or an anode, an electrolyte, and a separator. Often, in a lithium-ion battery pack, electrochemical cells are electrically connected in a stack to increase overall output. Lithium-ion electrochemical cells operate by reversibly passing lithium ions between the negative electrode and the positive electrode. The separator and the electrolyte are disposed between the negative and positive electrodes. The electrolyte is suitable for conducting lithium ions and may be in liquid, gel, or solid form. Lithium ions move from a positive electrode to a negative electrode during charging of the battery, and in the opposite direction when discharging the battery.

Each of the negative and positive electrodes within a stack is typically electrically connected to a current collector (e.g., a metal, such as copper for the negative electrode and aluminum for the positive electrode). During battery usage, the current collectors associated with the two electrodes are connected by an external circuit that allows current generated by electrons to pass between the negative and positive electrodes to compensate for transport of lithium ions.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

An exemplary schematic illustration of a lithium-ion battery 20 is shown in FIG. 1. The lithium-ion battery 20 includes a negative electrode 22, a positive electrode 24, and a porous separator 26 (e.g., a microporous or nanoporous polymeric separator) disposed between the negative and positive electrodes 22, 24. An electrolyte 30 is disposed between the negative and positive electrodes 22, 24 and in pores of the porous separator 26. The electrolyte 30 may also be present in the negative electrode 22 and positive electrode 24, such as in pores.

A negative electrode current collector 32 may be positioned at or near the negative electrode 22. A positive electrode current collector 34 may be positioned at or near the positive electrode 24. While not shown, the negative electrode current collector 32 and the positive electrode current collector 34 may be coated on one or both sides, as is known in the art. In certain aspects, the current collectors may be coated with an electroactive material/electrode layer on both sides. The negative electrode current collector 32 and positive electrode current collector 34 respectively collect and move free electrons to and from an external circuit 40. The interruptible external circuit 40 includes a load device 42 connects the negative electrode 22 (through the negative electrode current collector 32) and the positive electrode 24 (through the positive electrode current collector 34).

The porous separator 26 operates as both an electrical insulator and a mechanical support. More particularly, the porous separator 26 is disposed between the negative electrode 22 and the positive electrode 24 to prevent or reduce physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to electrically connect the negative electrode 22 and the positive electrode 24) when the negative electrode 22 contains a relatively greater quantity of cyclable lithium. The chemical potential difference between the positive electrode 24 and the negative electrode 22 drives electrons produced by the oxidation of lithium (e.g., intercalated/alloyed/plated lithium) at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to intercalate/alloy/plate into a positive electroactive material of the positive electrode 24. The electric current passing through the external circuit 40 can be harnessed and directed through the load device 42 until the lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the lithium ions at the positive electrode 24 to move back toward the negative electrode 22. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet or a motor vehicle alternator. A converter may be used to change from AC to DC for charging the battery 20.

In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in electrical series and/or parallel arrangement to provide a suitable electrical energy and power package. Furthermore, the lithium-ion battery 20 can include a variety of other components that, while not depicted here, are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and handheld consumer electronic devices are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and/or power as required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

Electrolyte

Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20. In certain variations, the electrolyte 30 may include an aqueous solvent (i.e., a water-based solvent) or a hybrid solvent (e.g., an organic solvent including at least 1% water by weight).

Appropriate lithium salts generally have inert anions. Non-limiting examples of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) (LiODFB), lithium tetraphenylborate ($LiB(C_6H_5)_4$); lithium bis-(oxalate)borate ($LiB(C_2O_4)_2$) (LiBOB); lithium tetrafluorooxalatophosphate ($LiPF_4(C_2O_4)$) (LiFOP), lithium nitrate ($LiNO_3$), lithium hexafluoroarsenate ($LiAsF_6$); lithium trifluoromethanesulfonate ($LiCF_3SO_3$); lithium bi s(trifluoromethanesulfonimi de) (LITFSI) ($LiN(CF_3SO_2)_2$); lithium fluorosulfonylimide ($LiN(FSO_2)_2$) (LIFSI); and combinations thereof. In certain variations, the electrolyte 30 may include a 1 M concentration of the lithium salts.

These lithium salts may be dissolved in a variety of organic solvents, such as organic ethers or organic carbonates, by way of example. Organic ethers may include dimethyl ether, glyme (glycol dimethyl ether or dimethoxyethane (DME, e.g., 1,2-dimethoxyethane)), diglyme (diethylene glycol dimethyl ether or bis(2-methoxyethyl) ether), triglyme (tri(ethylene glycol)dimethyl ether), additional chain structure ethers, such as 1-2-diethoxyethane, ethoxymethoxyethane, 1,3-dimethoxypropane (DMP), cyclic ethers, such as tetrahydrofuran, 2-methyltetrahydrofuran, and combinations thereof. In certain variations, the organic ether compound is selected from the group consisting of: tetrahydrofuran, 2-methyl tetrahydrofuran, dioxolane, dimethoxy ethane (DME), diglyme (diethylene glycol dimethyl ether), triglyme (tri(ethylene glycol)dimethyl ether), 1,3-dimethoxypropane (DMP), and combinations thereof. Carbonate-based solvents may include various alkyl carbonates, such as cyclic carbonates (e.g., ethylene carbonate, propylene carbonate, butylene carbonate) and acyclic carbonates (e.g., dimethyl carbonate, diethyl carbonate, ethyl methyl carbonate (EMC)). Ether-based solvents include cyclic ethers (e.g., tetrahydrofuran, 2-methyltetrahydrofuran, 1,3-dioxolane) and chain structure ethers (e.g., 1,2-dimethoxyethane, 1-2-diethoxyethane, ethoxymethoxyethane).

In various embodiments, appropriate solvents in addition to those described above may be selected from propylene carbonate, dimethyl carbonate, diethyl carbonate, methyl ethyl carbonate, γ-butyrolactone, dimethyl sulfoxide, acetonitrile, nitromethane and mixtures thereof.

Where the electrolyte is a solid state electrolyte, it may include a composition selected from the group consisting of: $LiTi_2(PO4)_3$, $LiGe_2(PO_4)_3$, $Li_7La_3Zr_2O_{12}$, $Li_3xLa_{2/3}$-$xTiO_3$, $Li_3PO_4$, $Li_3N$, $Li_4GeS_4$, $Li_{10}GeP_2S_{12}$, $L_{12}S$—$P_2S_5$, $Li_6PS_5Cl$, $Li_6PS_5Br$, $Li_6PS_5I$, $Li_3OCl$, $Li_{2.99}Ba_{0.005}ClO$, or any combination thereof.

Porous Separator

The porous separator 26 may include, in certain variations, a microporous polymeric separator including a polyolefin, including those made from a homopolymer (derived from a single monomer constituent) or a heteropolymer (derived from more than one monomer constituent)), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD® 2500 (a monolayer polypropylene separator) and CELGARD® 2340 (a trilayer polypropylene/polyethylene/polypropylene separator) available from Celgard LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, or a combination thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

Solid-State Electrolyte

In various aspects, the porous separator 26 and the electrolyte 30 may be replaced with a solid state electrolyte (SSE) that functions as both an electrolyte and a separator. The SSE may be disposed between a positive electrode and a negative electrode. The SSE facilitates transfer of lithium ions, while mechanically separating and providing electrical insulation between the negative and positive electrodes 22, 24. By way of non-limiting example, SSEs may include $LiTi_2(PO4)_3$, $LiGe_2(PO_4)_3$, $Li_7La_3Zr_2O_{12}$, $Li_3xLa_{2/3}$-$xTiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}$ $Ba_{0.005}ClO$, or combinations thereof.

Positive Electrode

The positive electrode 24 may be formed from or include a lithium-based active material that can undergo lithium intercalation and deintercalation, alloying and dealloying, or plating and stripping, while functioning as the positive terminal of the lithium-ion battery 20. The positive electrode 24 may include a positive electroactive material. Positive electroactive materials may include one or more transition metals cations, such as manganese (Mn), nickel (Ni), cobalt (Co), chromium (Cr), iron (Fe), vanadium (V), and combinations thereof. However, in certain variations, the positive electrode 24 is substantially free of select metal cations, such as nickel (Ni) and cobalt (Co).

Two exemplary common classes of known electroactive materials that can be used to form the positive electrode 24 are lithium transition metal oxides with layered structures and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically <0.15, including $LiMn_2O_4$ (LMO) and lithium manganese nickel oxide $LiMn_{1.5}Ni_{0.5}O_4$ (LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such as lithium manganese oxide ($Li_{(1+x)}Mn_{(2-x)}O_4$), a mixed lithium manganese nickel oxide ($LiMn_{(2-x)}Ni_xO_4$), where $0 \leq x \leq 1$, and/or a lithium manganese nickel cobalt oxide (e.g., $LiMn_{0.33}Ni_{0.33}Co_{0.33}O_2$). In a lithium-sulfur battery, positive electrodes may have elemental sulfur as the active material or a sulfur-containing active material.

The positive electroactive materials may be powder compositions. The positive electroactive materials may be intermingled with an optional electrically conductive material (e.g., electrically-conductive particles) and a polymeric binder. The binder may both hold together the positive electroactive material and provide ionic conductivity to the positive electrode 24. The polymeric binder may include polyvinylidene fluoride (PVdF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diene monomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene difluoride (PVdF), lithium polyacrylate (LiPAA), sodium po lyacrylate (NaPAA), sodium alginate, lithium alginate, or a combination thereof.

The positive electroactive material loading in the binder can be large, such as greater than about 80% by weight. For example, the binder can be present at a level of greater than or equal to about 1% by weight to less than or equal to about 20% by weight, optionally greater than or equal to about 1% by weight to less than or equal to about 10% by weight, optionally greater than or equal to about 1% to less than or equal to about 8% by weight, optionally greater than or equal to about 1% by weight to less than or equal to about 6% by weight, optionally greater than or equal to about 1% by weight to less than or equal to about 7% by weight, optionally greater than or equal to about 1% by weight to less than or equal to about 5% by weight, or optionally greater than or equal to about 1% by weight to less than or equal to about 3% by weight binder.

Electrically conductive materials may include graphite, other carbon-based materials, conductive metals, or conductive polymer particles. Carbon-based materials may include, by way of non-limiting example, particles of KETCHEN™ black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

In certain variations, the positive electrode 24 includes the electrically-conductive material in an amount less than or equal to about 15% by weight, optionally less than or equal to about 10% by weight, or optionally greater than or equal to about 0.5% by weight to less than or equal to about 8% by weight. While the supplemental electrically conductive compositions may be described as powders, these materials lose their powder character following incorporation into the electrode where the associated particles of the supplemental electrically conductive material become a component of the resulting electrode structure.

Negative Electrode

The negative electrode 22 may include a negative electroactive material as a lithium host material capable of functioning as a negative terminal of the lithium-ion battery 20. Common negative electroactive materials include lithium insertion materials or alloy host materials. Such materials can include carbon-based materials, such as lithium-graphite intercalation compounds, lithium-silicon compounds, lithium-tin alloys, or lithium titanate $Li_{4+x}Ti_5O_{12}$, where $0 \leq x \leq 3$, such as $Li_4Ti_5O_{12}$ (LTO).

In certain aspects, the negative electrode 22 may include lithium, and in certain variations metallic lithium and the lithium-ion battery 20. The negative electrode 22 may be a lithium metal electrode (LME). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

In certain variations, the negative electrode 22 may optionally include an electrically conductive material, as well as one or more polymeric binder materials to structurally hold the lithium material together. For example, in one embodiment, the negative electrode 22 may include an active material including lithium-metal particles intermingled with a binder material selected from the group consisting of: polyvinylidene difluoride (PVdF), ethylene propylene diene monomer (EPDM) rubber, carboxymethoxyl cellulose (CMC), a nitrile butadiene rubber (NBR), lithium polyacrylate (LiPAA), sodium polyacrylate (NaPAA), sodium alginate, lithium alginate, or a combination thereof. Suitable additional electrically conductive materials may include carbon-based material or a conductive polymer. Carbon-based materials may include by way of example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The negative electrode 22 may include about 50-100% by weight of an electroactive material (e.g., lithium particles or a lithium foil), optionally greater than or equal to about 30% by weight of an electrically conductive material, and a balance binder.

Electrode Fabrication

In various aspects, the negative and positive electrodes 22, 24 may be fabricated by mixing the respective electroactive material into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calender it. In other variations, the film may be dried at moderate temperature to form self-supporting films. If the substrate is removable, then it is removed from the electrode film that is then further laminated to a current collector. With either type of substrate, the remaining plasticizer may be extracted prior to incorporation into the battery cell. In various aspects, a solid electrode may be formed according to alternative fabrication methods.

Optional Electrode Surface Coatings

In certain variations, pre-fabricated negative electrodes 22 and positive electrodes 24 formed via the active material slurry casting described above can be directly coated via a vapor coating formation process to form a conformal inorganic-organic composite surface coating, as described further below. Thus, one or more exposed regions of the pre-fabricated negative electrodes including the electroactive material can be coated to minimize or prevent reaction of the electrode materials with components within the electrochemical cell to minimize or prevent lithium metal dendrite formation on the surfaces of negative electrode materials when incorporated into the electrochemical cell. In other variations, a plurality of particles including an electroactive material, like lithium metal, can be coated with an inorganic-organic composite surface coating. Then, the coated electroactive particles can be used in the active material slurry to form the negative electrode, as described above.

Current Collectors

The negative and positive electrodes 22, 24 are generally associated with the respective negative and positive electrode current collectors 32, 34 to facilitate the flow of electrons between the electrode and the external circuit 40. The current collectors 32, 34 are electrically conductive and can include metal, such as a metal foil, a metal grid or screen, or expanded metal. Expanded metal current collectors refer to metal grids with a greater thickness such that a greater amount of electrode material is placed within the metal grid. By way of non-limiting example, electrically-conductive materials include copper, nickel, aluminum, stainless steel, titanium, alloys thereof, or combinations thereof.

The positive electrode current collector 34 may be formed from aluminum or any other appropriate electrically conductive material known to those of skill in the art. The negative electrode current collector 32 may be formed from copper or any other appropriate electrically conductive material known to those of skill in the art. Negative electrode current collectors do not typically include aluminum because aluminum reacts with lithium, thereby causing large volume expansion and contraction. The drastic volume changes may lead to fracture and/or pulverization of the current collector.

Electrochemical Cells

In one example, the negative electrode 22 includes lithiated aluminum as the negative electroactive material and the positive electrode 24 includes NMC-622 as the positive electroactive material. The electrolyte 30 may be present in the negative electrode 22, the positive electrode 24, and the separator 26. The negative electrode current collector 32 includes copper and the positive electrode current collector 34 includes aluminum. Volume and weight percentages of each component are shown below in Table 1.

TABLE 1

| Component | Volume Percent | Weight Percent |
| --- | --- | --- |
| Negative electrode 22 | 21 | 20 |
| Positive electrode 24 | 18 | 39 |
| Separator 26 | 5 | 2 |
| Electrolyte 30 | 26 | 18 |
| Negative Electrode Current Collector 32 | 1 | 6 |
| Positive Electrode Current Collector 34 | 2 | 2 |

Lithium Alloy-Based Electrodes

In various aspects, the present disclosure provides lithium alloy-based electrodes and electrochemical cells including the lithium alloy-based electrodes. The electrodes may, in certain aspects, include a lithium-aluminum alloy as a negative electroactive material, as described below. The electrode includes a negative electroactive material defining a body and a layer disposed on at least one side of the body. The negative electroactive material includes the lithium-metal alloy-based electroactive material, such as the lithium-aluminum alloy. The layer includes a porous metal oxide, such as anodic aluminum oxide. The layer may be electrically insulating. The present disclosure also provides, in various aspects, methods of making the lithium metal alloy-based electrodes. In certain aspects, the layer may be formed in an anodizing process and the alloy may be formed by pre-lithiation of a metal foil.

The body of the electrode may be electrically conductive and serve as a current collector. Therefore, electrochemical cells including the lithium metal-based electrode may be free of a distinct current collector component (e.g., copper foil). Furthermore, the body may have a low porosity compared to other electroactive materials. The low porosity facilitates a reduction of electrolyte in the electrochemical cell. The reduction of electrolyte and the elimination of the current collector lead to an increase in gravimetric and/or volumetric energy density compared to electrochemical cells having higher-porosity electrodes connected to distinct current collector components.

The pores of the layer may permit fluid communication between the electrolyte and the body, thereby facilitating ion transport. Furthermore, the layer may be electrically insulating. Accordingly, the layer may, in certain aspects, serve as a separator. An electrochemical cell including the lithium metal-based electrode may be free of a distinct separator component.

During cycling of an electrochemical cell including certain metal-based negative electrodes (e.g., aluminum-based negative electrodes), alloying of lithium with the metal leads to large volume expansion and contraction in the electrode. Accordingly, such cells may be subject to fracture and/or pulverization that can lead to a decreased cycle life of the cell. In certain variations, the layer may provide mechanical support to the body during cycling to reduce or prevent mechanical degradation due to volume change. Moreover, in certain aspects, the body may include a lithium gradient formed during pre-lithiation. As a result of the gradient, a portion of the body may include a reduced lithium content or be substantially free of lithium to create a region of higher strength. The above characteristics can lead to increases in cycle life compared to other electrochemical cells that experience drastic volume change.

Lastly, the pre-lithiation process creates a lithium reservoir in the electrode. More particularly, the pre-lithiation creates a stoichiometric excess of lithium within electrode. The lithium reservoir may compensate for lithium loss during cycling. Accordingly, an electrochemical cell including the pre-lithiated lithium metal alloy-based electrode may have decreased capacity loss compared to cells that are not pre-lithiated.

Figure 2:
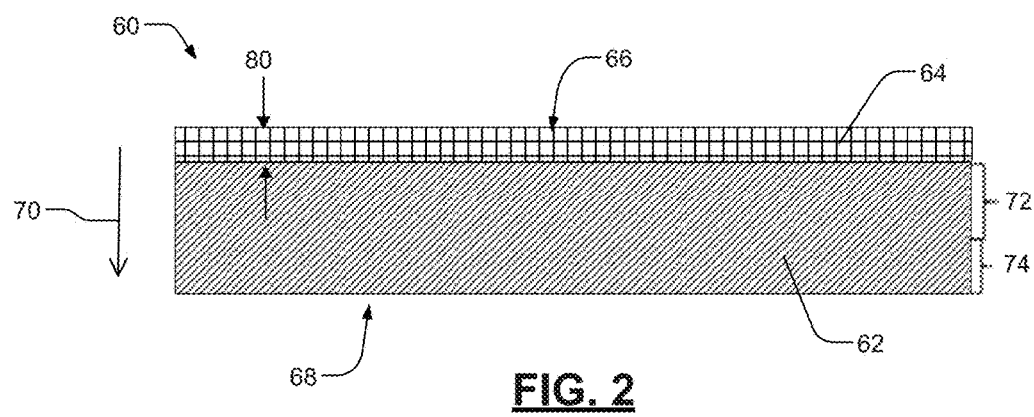
FIG. 2 is a schematic view of a negative electrode according to various aspects of the present disclosure.

With reference to FIG. 2, an electrode 60 according to various aspects of the present disclosure is provided. The electrode 60 includes a body 62 and a layer 64. The body 62 includes an electroactive material, such as a negative electroactive material, which may itself be electrically conductive. Thus, the body 62 can function as a current collector in addition to facilitating electrochemical activity. The layer 64 provides mechanical support to the body 62 to reduce or prevent pulverization of the body during cycling of an electrochemical cell including the electrode 60. Additionally, the layer 64 may be ionically conductive and electrically insulating. The layer 64 may, in certain aspects, function as a separator.

The body 62 and the layer 64 are coupled to one another. More particularly, the body 62 and the layer 64 are integrally formed. The layer 64 is in direct contact with the body 62. The electrode 60 may include a first side 66 and a second side 68 opposite the first side 66. The layer 64 may extend along at least a portion of the first side 66. In certain aspects, the layer 64 may extend along substantially the entire first side 66 of the electrode 60. In certain aspects, the body 62 may be a monolithic, substantially planar structure having a length and width that are both substantially greater than a thickness. In various aspects, the body 62 may be described as an electroactive material layer and the layer 64 may be described as a support layer.

The body 62 includes the electroactive material. The electroactive material may be a negative electroactive material. As such, as described above, the electrode 60 may be referred to as the negative electrode 60. As will be discussed in greater detail below in conjunction with the method of FIG. 7, the negative electroactive material may be pre-lithiated. The pre-lithiation increases a lithium reservoir in the body 62. The increased lithium reservoir compensates for lithium lost during cycling of the electrochemical cell including the negative electrode 60, thereby decreasing a magnitude of capacity loss during cycling (see, e.g., FIG. 10 and accompanying text).

The negative electroactive material includes a lithium-metal alloy. The negative electroactive material may include a lithium-metal alloy, lithium, and the metal. The metal may be selected from the group consisting of aluminum, magnesium, zinc, tin, indium, any alloy thereof, or any combination thereof. Thus, the negative electroactive material may include a lithium-aluminum alloy, a lithium-magnesium alloy, a lithium-zinc alloy, a lithium-tin alloy, a lithium-indium alloy, any further alloy thereof, or any combination thereof.

In certain aspects, the metal includes aluminum. The negative electroactive material may include a lithium-aluminum alloy. The negative electroactive material may further include lithium and/or aluminum. In certain aspects, the negative electroactive material may consist essentially of lithium, aluminum, and alloys thereof (including any potential impurities). In further aspects, the negative electroactive material may consist essentially of a lithium-aluminum alloy and aluminum (and any potential impurities), such that substantially all of the lithium has been alloyed with aluminum. In further aspects, the negative electroactive material may consist essentially of the lithium-aluminum alloy (and any potential impurities). In various aspects, a molar ratio of aluminum to lithium may be greater than or equal to about 1:10, optionally greater than or equal to 1:1, or optionally greater than or equal to about 10:1. Higher ratios of aluminum to lithium result in a greater portion of the lithium, such as substantially all of the lithium, alloying with the aluminum rather than plating onto the aluminum. Thus, in certain aspects, the molar ratio of aluminum to lithium may be greater than or equal to about 1:1, optionally greater than or equal to about 2:1, optionally greater than or equal to about 3:1, optionally greater than or equal to about 4:1, optionally greater than or equal to about 5:1, optionally greater than or equal to about 6:1, optionally greater than or equal to about 7:1, optionally greater than or equal to about 8:1, optionally greater than or equal to about 9:1, or optionally greater than or equal to about 10:1.

The body 62 may have a concentration gradient between the first side 66 and the second side 68. More particularly, the body 62 may include a first molar concentration of lithium adjacent to the first side 66 and a second molar concentration of lithium on the second side 68. The first molar concentration may be greater than the second molar concentration. The molar concentration of lithium may decrease between the first side 66 and the second side 68, as indicated by the arrow 70.

In certain aspects, the second molar concentration may be about zero. Thus, a first portion 72 of the body 62 may include lithium, while a second portion 74 of the body is substantially free of lithium. The first portion 72 may engage in electrochemical activity. The second portion 74 may have a higher strength than the first portion 72. Thus, the second portion 74 may be referred to as a "high strength region." The concentration gradient may therefore provide a balance between electrochemical activity and mechanical strength. In certain other aspects, the first and second portions 72, 74 may both include lithium.

In various aspects, the body 62 has a relatively low porosity compared to other negative electroactive materials (e.g., graphite). The body 62 may have a porosity of greater than or equal to 0 volume percent to less than or equal to about 15 volume percent, optionally less than or equal to about 10 volume percent, optionally less than or equal to about 8 volume percent, optionally less than or equal to about 5 volume percent, optionally less than or equal to about 4 volume percent, optionally less than or equal to about 3 volume percent, optionally less than or equal to about 2 volume percent, or optionally less than or equal to about 1 volume percent. In certain aspects, the body 62 may be substantially nonporous.

Certain electroactive materials, such as aluminum or lithium-aluminum alloys, may be susceptible to fracture and eventual pulverization due to large volume changes in the body 62 during cycling of an electrochemical cell including the electrode 60. The fracture and pulverization can lead to a decreased cycle life of the electrochemical cell. Pre-lithiating the electrode 60 may reduce or prevent fracture and/or pulverization caused by volume change. In various aspects, the layer 64 may provide mechanical support to the body 62 to further reduce or prevent fracture and/or pulverization of the body 62 during cycling of an electrochemical cell including the electrode 60.

The layer 64 includes a metal oxide. The metal of the metal oxide is the same as the metal of the lithium-metal alloy. Thus, the layer 62 may include aluminum oxide ($Al_2O_3$), magnesium oxide (MgO), zinc oxide (ZnO), tin oxide ($SnO_2$), indium oxide ($In_2O_3$), or combinations thereof. The aluminum oxide may be anodic aluminum oxide, such as anodic nanoporous aluminum oxide, by way of example. The layer 64 may be ionically conductive and electrically insulating. Therefore, the layer 64 may, in certain aspects, function as a separator, as will be described in greater detail below in conjunction with FIG. 4.

In certain aspects, the layer 64 includes lithium after pre-lithiation. Accordingly, the layer 64 may include a lithium-metal oxide. The metal of the lithium-metal oxide is the same as the metal of the lithium-metal alloy. In one example, the lithium-metal oxide is lithium aluminate ($LiAlO_2$). The layer 64 may be ionically conductive and electrically insulating. Additionally, the layer 64 may serve as an artificial solid electrolyte interphase (SEI) and reduce or prevent electrolyte decomposition.

The layer 64 may be porous. The pores of the layer 64 (see, e.g., pores 314 of FIG. 9B) may facilitate ion transport by providing a path for an electrolyte to contact the body 62. Accordingly, at least a portion of the pores may extend continuously through the layer 64 to the body 62. In certain aspects, a high porosity may provide a large surface area for the layer 64. The large surface area may facilitate effective ion transfer through the layer 64 between an electrolyte and the body 62.

In certain aspects, a porosity of the layer 64 may be greater than or equal to about 20 volume percent to less than or equal to about 70 volume percent (e.g., greater than or equal to about 20 volume percent to less than or equal to about 30 volume percent, greater than or equal to about 30 volume percent to less than or equal to about 40 volume percent, greater than or equal to about 40 volume percent to less than or equal to about 50 volume percent, greater than or equal to about 50 volume percent to less than or equal to about 60 volume percent, greater than or equal to about 60 volume percent to less than or equal to about 70 volume percent). In certain aspects, the porosity may optionally be greater than or equal to about 25 volume percent to less than or equal to about 60 volume percent, optionally greater than or equal to about 30 volume percent to less than or equal to about 50 volume percent, or optionally greater than or equal to about 35 volume percent to less than or equal to about 45 volume percent. The porosity may be optimized to provide a balance between mechanical strength (favoring a lower porosity) and ion transport (favoring a higher porosity).

In certain aspects, the pores of the layer 64 may have sizes ranging from greater than or equal to about 75 angstroms to less than or equal to about 330 angstroms, optionally greater than or equal to about 100 angstroms to less than or equal to about 300 angstroms, optionally greater than or equal to about 100 angstroms to less than or equal to about 250 angstroms, or optionally greater than or equal to about 125 angstroms to less than or equal to about 225 angstroms. The layer 64 may have a density of greater than or equal to about 0.5 g/cm$^3$ to less than or equal to about 3.95 g/cm$^3$, optionally greater than or equal to about 1 g/cm$^3$ to less than or equal to about 3 g/cm$^3$, or optionally greater than or equal to about 2.25 g/cm$^3$ to less than or equal to about 2.4 g/cm$^3$ (e.g., about 2.32 g/cm$^3$). An areal weight of the layer 64 may be greater than or equal to about 2.4 mg/cm$^3$ to less than or equal to about 4.18 mg/cm$^3$. A roughness of the layer 64 may be greater than or equal to about 1 micron to less than or equal to about 4 microns, optionally greater than or equal to about 1.5 microns to less than or equal to about 3 microns, greater than or equal to about 2.1 microns to less than or equal to about 2.3 microns, or optionally about 2.2 microns.

The layer 64 may define a thickness 80 of less than or equal to about 10 microns, optionally less than or equal to about 8 microns, optionally less than or equal to about 5 microns, or optionally less than or equal to about 3 microns. In one example, the thickness 80 is greater than or equal to about 5 microns to less than or equal to about 10 microns. In another example, the thickness 80 is greater than or equal to about 2 microns to less than or equal to about 5 microns.

In various aspects, the electrode 60 may be substantially free of a distinct binder material and a distinct electrically-conductive material (in addition to the negative electroactive material), such as those described above in conjunction with FIG. 1. Accordingly, the body 62 may consist essentially of the electroactive material and an electrolyte disposed in pores of the body 62. The electrode 60 may consist essentially of the electroactive material, an electrolyte, and the layer. In certain aspects, the body 62 is substantially non-porous and the body 62 consists essentially of the electroactive material. Elimination of distinct binder and electrically conductive components may facilitate an increase in energy density.

Figure 3:
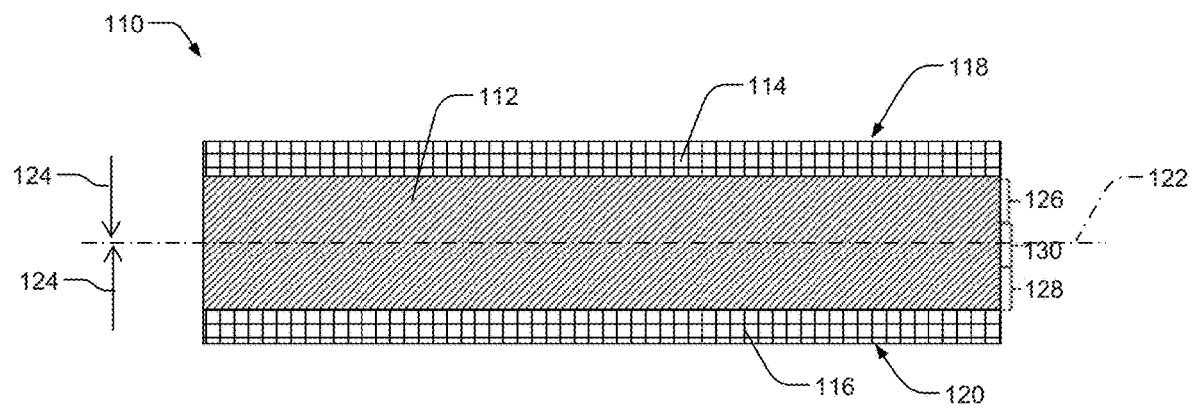
FIG. 3 is a schematic view of another negative electrode according to various aspects of the present disclosure.

Referring to FIG. 3, another electrode 110 according to various aspects of the present disclosure is provided. The electrode 110 includes a body 112, first layer 114, and a second layer 116. The first layer 114 may be disposed on a first side 118 of the electrode 110. The second layer 116 may be disposed on a second side 120 of the electrode 110 opposite the first side 118. In some examples, the electrode 110 is a negative electrode positioned between two positive electrodes.

Unless otherwise described, the body 112 may be similar to the body 62 of the electrode 60 of FIG. 2. In various aspects, the body 62 may have a molar concentration gradient. More particularly, a molar lithium concentration may decrease toward a center plane 122 of the electrode 110, as indicated by arrows 124. In certain aspects, the body 112 may include first and second portions 126, 128 disposed adjacent to the first and second layers 114, 116, respectively, that include lithium. The body 112 may further include a third portion 130 disposed between the first and second portions 126, 128 and including the center plane 122 that is substantially free of lithium. The third portion 130 may be referred to as a "high strength region." In certain other aspects, the first, second, and third portions 126, 128, 130 all include lithium.

The first and second layers 114, 116 may be substantially identical. Each of the first and second layers 114, 116 may be similar to the layer 64 of the electrode 60 of FIG. 2. When the electrode 110 is in an electrochemical cell or stack of cells, it may be disposed between two positive electrodes. Each of the layers 114, 116 may be disposed between the body 112 and a respective positive electrode.

Figure 4:
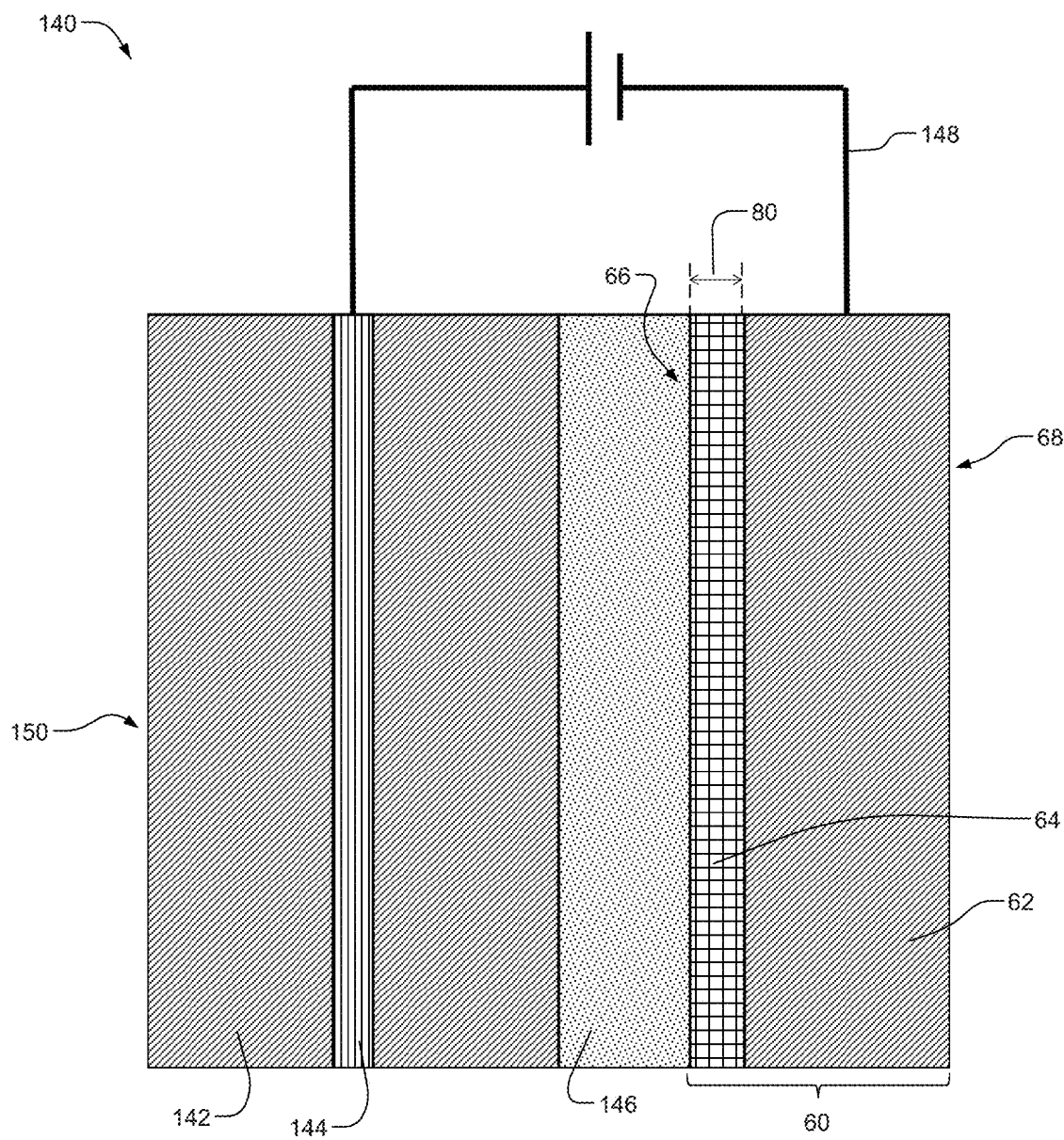
FIG. 4 is a schematic view of an electrochemical cell according to various aspects of the present disclosure, the electrochemical cell including the negative electrode of FIG. 2.

With reference to FIG. 4, an electrochemical cell 140 according to various aspects of the present disclosure is provided. The electrochemical cell 140 includes the electrode 60 of FIG. 2 as a negative electrode. The electrochemical cell 140 further includes a positive electrode 142, a positive electrode current collector 144, and an electrolyte 146. The electrochemical cell 140 is electrically connected to an external circuit 148 via the positive electrode current collector 144 and the body 62 of the negative electrode 60.

The body 62 of the negative electrode 60 is electrically conductive. In various aspects, the body 62 functions as a current collector within the electrochemical cell 140. The metal of the electrode 60, such as aluminum, can serve as a current collector because the layer 64 provides sufficient mechanical support to reduce or prevent fracture and pulverization. The body 62 may therefore be electrically connected to the external circuit 148, either directly or through a terminal (not shown). Accordingly, the electrochemical cell 140 may be free of a distinct negative electrode current collector.

As described above in conjunction with FIG. 1, electrochemical cells typically include a current collector associated with each of the respective electrodes. Such current collectors contribute to overall weight and volume of the cell and may therefore decrease energy density. Certain negative electroactive materials, such as those including aluminum, are significantly lighter in weight than copper. For example, the negative electrode 60 may include a lithium aluminum alloy having a density of greater than or equal to about 1 g/cm$^3$ to less than or equal to about 2.7 g/cm$^3$. Therefore, eliminating the copper negative electrode current collector in favor of the negative electroactive material of the body 62 can yield significant reductions in weight of the electrochemical cell. Accordingly, the electrochemical cell 140 may have an increased gravimetric energy density compared to an electrochemical cell having a distinct separator, such as a distinct copper separator (see, e.g., the negative electrode current collector 32 of FIG. 1).

In certain aspects, the layer 64 may function as a separator and eliminate the need for a distinct separator in the electrochemical cell 14. The layer 64 may be electrically insulating. The layer 64 may be porous such that it is configured to permit ion transfer therethrough. The layer 64 may function as a separator, for example, when the thickness 80 is greater than or equal to about 5 microns. Accordingly, the electrochemical cell 140 may be free of a distinct separator, such as a microporous polymeric separator or a ceramic separator.

The electrolyte 146 may be present between positive and negative electrodes 142, 60. The electrolyte 146 may also be present in pores of the positive electrode 142, pores of the layer 64, and pores of the body 62, if present. In one example, in a typical electrochemical cell, such as the lithium-ion battery 20 of FIG. 1, about one third of the electrolyte is present in the porous negative electrode. In contrast, the body 62 of the electrode 60 may have a relatively low porosity compared to other negative electroactive materials (e.g., graphite). Accordingly, the body 62 may be referred to as dense. The low porosity of the body 62 may facilitate a reduction in amount of the electrolyte 146 used compared to electrochemical cells having other negative electroactive materials. In general, as a result of the low porosity of the body 62, the electrochemical cell 140 has an increased gravimetric energy density and an increased volumetric energy density compared to electrochemical cells having more porous negative electrodes.

In one example, the electrochemical cell 140 may include the electrolyte 146 in an amount greater than or equal to about 6 weight percent to less than or equal to about 16 weight percent, greater than or equal to about 8 weight percent to less than or equal to about 14 weight percent, or optionally greater than or equal to about 10 weight percent to less than or equal to about 12 weight percent. In another example, to achieve a capacity of about 600 mAh, the electrochemical cell 140 may include an aluminum-lithium alloy as the negative electroactive material and NMC as the positive electroactive material. The electrochemical cell 140 includes about 1.5 grams of the electrolyte 146. A reference electrochemical cell (which may be similar to the lithium-ion battery 20 of FIG. 1) includes graphite as the negative electroactive material and NMC as the positive electroactive material. The reference electrochemical cell includes about 2 grams of electrolyte.

The positive electrode 142 may include a positive electroactive material, such as those described above in conjunction with the positive electrode 24 of FIG. 1. In certain variations, the positive electroactive material may be selected from the group consisting of: lithium nickel manganese cobalt oxide (NMC), lithium nickel cobalt aluminum oxide (NCA), $LiFePO_4$, $LiCoO_2$, $LiMnO_2$, $LiMn_{1.5}Ni_{0.5}O_2$, or combinations thereof, by way of example. In some examples, the positive electroactive material may include NMC-622 ($LiNi_{0.6}Co_{0.2}Mn_{0.2}O_2$). The positive electrode 142 may be electrically connected to the positive electrode current collector 144. In certain aspects, the positive electrode current collector 144 is disposed in an intermediate position within the positive electrode 142, such as a center of the positive electrode 142. In certain alternative aspects, the positive electrode current collector 142 may be positioned on an outer side 150 of the positive electrode 142.

The electrolyte 146 may include any of the compositions discussed in conjunction with the electrolyte 30 of FIG. 1. In certain variations, the electrolyte 146 is substantially free of ethylene carbonate (EC). Accordingly, the electrochemical cell 140 including the electrolyte 146 may perform well at lower temperatures, such as those less than or equal to 20° C.

Certain combinations of lithium salt and solvent in the electrolyte 146 may facilitate a high Coulombic efficiency for the electrochemical cell 140. In one example, the electrolyte 146 includes (i) a salt including lithium perchlorate ($LiClO_4$) and (ii) a non-aqueous solvent (e.g., dimethyl carbonate). In another example, the electrolyte 146 includes (i) a salt including lithium bis(fluorosulfonyl)imide (LiFSI) ($F_2LiNO_4S_2$), lithium bis(trifluoromethanesulfonyl)imide (LiTFSI) ($LiC_2F_6NO_4S_2$), or a combination of LiFSI and LiTFSI and (ii) an aqueous solvent (e.g., water), a non-aqueous solvent (e.g., dimethyl carbonate), or a hybrid solvent (e.g., 50% water by weight and 50% dimethyl carbonate by weight). In yet another example, the electrolyte 146 includes (i) a salt including lithium hexafluorophosphate ($LiPF_6$) and (ii) fluoroethylene carbonate (FEC) ($C_3H_3FO_3$). The FEC may be present an additive or a co-solvent. A solvent may include another organic solvent (e.g., dimethyl carbonate (DMC) ($C_3H_6O_3$), diethyl carbonate (DEC) ($C_5H_{10}O_3$)).

Figure 5:
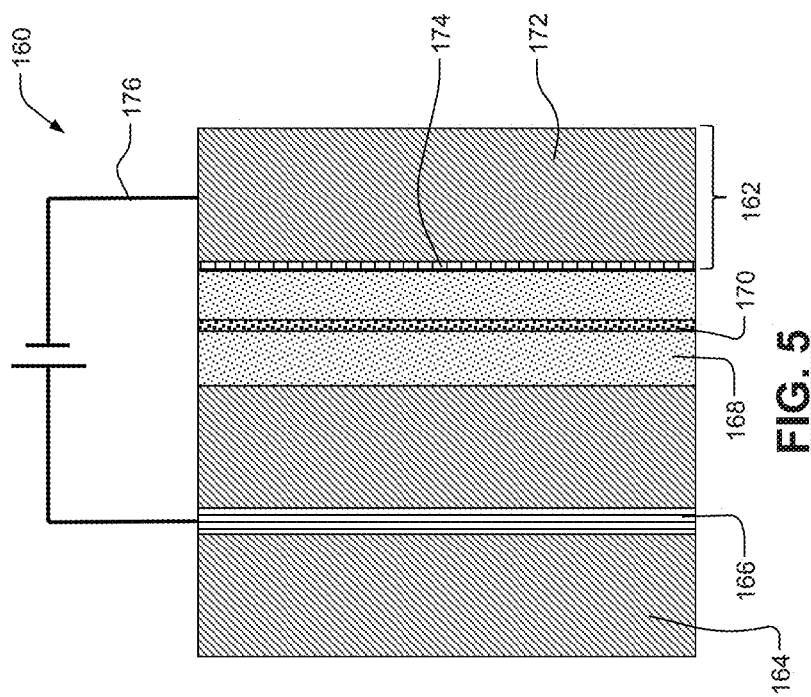
FIG. 5 is a schematic view of another electrochemical cell according to various aspects of the present disclosure, the electrochemical cell including a distinct separator.

Referring to FIG. 5, another electrochemical cell 160 according to various aspects of the present disclosure is provided. The electrochemical cell 160 may include a negative electrode 162, a positive electrode 164, a positive electrode current collector 166, an electrolyte 168, and a separator 170. The positive electrode 164 and the positive electrode current collector 166 may be similar to the positive electrode 142 and the positive electrode current collector 144 of FIG. 4. The negative electrode 162 includes a body 172 and a layer 174. Unless otherwise described, the body 172 and the layer 174 may be similar to the body 62 and the layer 64 of the negative electrode 60 of FIG. 2. The electrochemical cell 160 is connected to an external circuit 176. More particularly, the external circuit 176 is electrically connected to the body 172 and the positive electrode current collector 166.

The separator 170 may be a microporous polymeric separator, such as those described above with respect to FIG. 1. In certain aspects, the separator 170 may be substantially free of a ceramic material. The separator 170 may be disposed within the electrolyte 146 between the negative electrode 162 and the positive electrode 164. In certain aspects, the electrochemical cell 160 may include the separator 170 when the layer 174 is less than or equal to about 5 microns, optionally less than or equal to about 4 microns, optionally less than or equal to about 3 microns, or optionally less than or equal to about 2 microns. The electrolyte 168 may be similar to the electrolyte 146 of FIG. 4.

Figure 6:
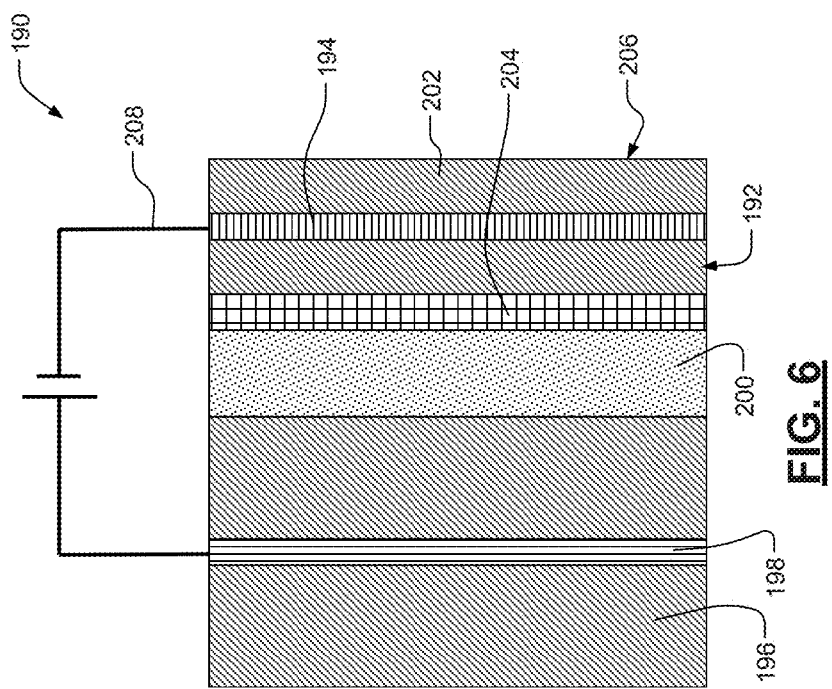
FIG. 6 is a schematic view of yet another electrochemical cell according to various aspects of the present disclosure, the electrochemical cell including a distinct negative electrode current collector.

With reference to FIG. 6, yet another electrochemical cell 190 according to various aspects of the present disclosure is provided. The electrochemical cell 190 includes a negative electrode 192, a negative electrode current collector 194, a positive electrode 196, a positive electrode current collector 198, and an electrolyte 200. The positive electrode 196 and the positive electrode current collector 198 may be similar to the positive electrode 164 and the positive electrode current collector 166 of FIG. 4. The electrolyte 200 may be similar to the electrolyte 146 of FIG. 4.

The negative electrode 192 includes a body 202 and a layer 204. Unless otherwise described, the body 202 and the layer 204 may be similar to the body 62 and the layer 64 of the electrode 60 of FIG. 2. However, in contrast to the electrode 60 of FIG. 2, the negative electrode 192 is electrically connected to the distinct negative electrode current collector 194. In certain aspects, the negative electrode current collector 194 may include aluminum, a lithium-aluminum alloy, magnesium, zinc, indium, gallium, or any combination thereof. The aluminum may have a different morphology or treatment than the metal (e.g., aluminum) of the body 202. The negative electrode current collector 194 may be disposed at an intermediate position within the negative electrode 192, such as a center of the negative electrode 192. In certain alternative variations, the negative electrode current collector 194 may be disposed on an outer side 206 (similar to the second side 68 of the electrode 60 of FIG. 2) of the negative electrode 192. The electrochemical cell 190 is electrically connected to an external circuit 208 via the negative electrode current collector 194 and the positive electrode current collector 198.

In various aspects, the present disclosure provides methods of making lithium-metal alloy electrodes and methods of making electrochemical cells including the lithium-metal alloy electrodes. The method is described in the context of the electrode 60 of FIG. 2. However, those skilled in the art will appreciate that the methods described herein are similarly applicable to other electrodes and electrochemical cells according to various aspects of the present disclosure.

Figure 7:
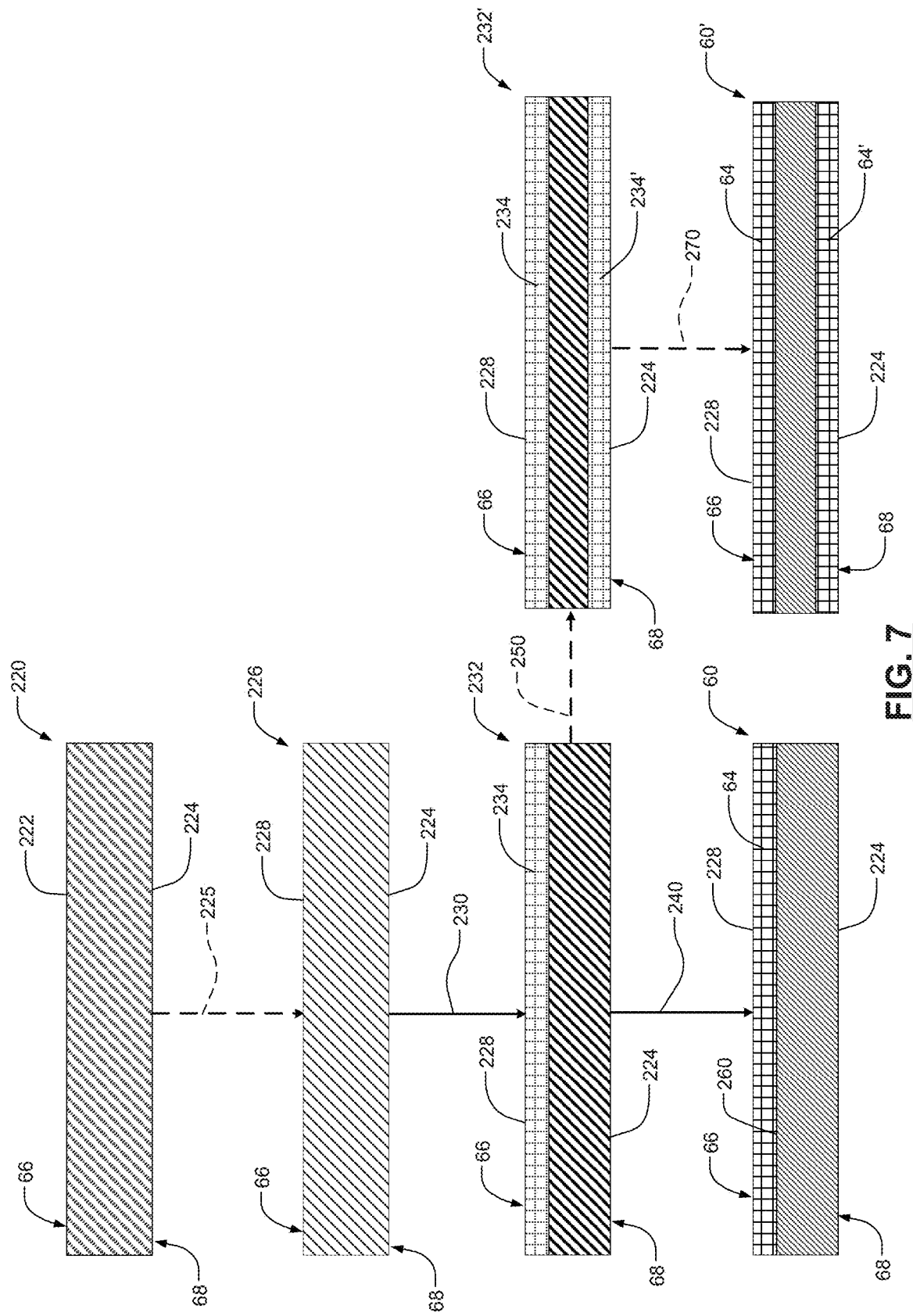
FIG. 7 is a schematic of a method of making the negative electrode of FIG. 2 according to various aspects of the present disclosure.

Referring to FIG. 7, the method includes providing a first electrode precursor 220. In certain aspects, the first electrode precursor 220 may be a foil. The first electrode precursor 220 may have a substantially planar shape. The first electrode precursor may extend between first surface 222 and a second surface 224 opposite the first surface 222.

The first electrode precursor 220 includes a metal. In certain aspects, the first electrode precursor 220 may consist essentially of the metal. The first electrode precursor 220 may include the metal at greater than or equal to about 95 weight percent, optionally greater than or equal to about 96 weight percent, optionally greater than or equal to about 97 weight percent, optionally greater than or equal to about 98 weight percent, or optionally greater than or equal to about 99 weight percent.

The metal may be selected from the group consisting of aluminum, magnesium, zinc, tin, indium, any alloy thereof, or any combination thereof. The first electrode precursor 220 may further include lithium, such as in the form of a lithium-metal alloy. Thus, the first electrode precursor 220 may include a lithium-aluminum alloy, a lithium-magnesium alloy, a lithium-zinc alloy, a lithium-tin alloy, or any combination thereof, by way of example. In certain aspects, the metal includes aluminum. In one example, the first electrode precursor 220 consists essentially of aluminum. In another example, the first electrode precursor 220 includes a lithium-aluminum alloy. The first electrode precursor 220 may consist essentially of the lithium-aluminum alloy.

In various aspects, the method may optionally include a surface roughening step at 225. More particularly, the first surface 222 of the first electrode precursor 220 may be roughened to form a second electrode precursor 226 having a roughened first surface 228. The roughening step 225 may include sanding blasting, mechanical grinding, plasma etching, or combinations thereof, by way of example. The roughened first surface 228 may have a roughness that is greater than or equal to about 0.6 times a roughness of the first surface 222, optionally greater than or equal to about 0.8 times, optionally greater than or equal to about 1 time, optionally greater than or equal to about 1.2 times, optionally greater than or equal to about 1.4 times, or optionally greater than or equal to about 1.6 times. The increase in surface area may reduce current density during use of the electrode 60 in an electrochemical cell. The reduced current density may facilitate improved cycle stability and extended cycle life.

At 230, the second electrode precursor 226 is anodized to form a third electrode precursor 232. More particularly, the first roughened surface 228 of the second electrode precursor 226 (or the first surface 222 of the first electrode precursor 220, if the roughening step 225 is omitted) is anodized to form a layer precursor 234. The layer precursor 234 includes a metal-oxide including the metal of the first electrode precursor 220. In certain aspects, porosity and thickness of the layer precursor 234 may be controlled based on one or more of working potential, current density, concentration of an anodizing solution, characteristics of the first electrode precursor 220, and processing steps.

In various aspects, such as in a large-scale manufacturing operation, a roll-to-roll process may be used to continuously anodize an electrode precursor at step 230. In a roll-to-roll process the thickness of the layer 64 can be controlled, at least in part, by controlling rolling speed.

The method may proceed to either step 240 or step 250. More particularly, the method may proceed to step 240 to pre-lithiate the third electrode precursor 232 and form the electrode 60. However, to form an electrode similar to the electrode 100 of FIG. 3, the method may optionally continue at step 250 to form a second layer precursor 234'.

At 250, the second surface 224 is anodized form an alternative third electrode precursor 232'. The alternative third electrode precursor 232' may include the layer precursor 234 disposed on the first side 66, and another layer precursor 234' disposed on the second side 68. The method may proceed at 270.

At 240, the third electrode precursor 232 is pre-lithiated to form the electrode 60. In various alternative aspects, pre-lithiating at step 240 may be performed prior to anodizing step 230. Surface roughening at step 225 may be performed at any point prior to anodizing at step 230. During pre-lithiation, lithium alloys with the metal to form the body 62 including the lithium-metal alloy. In certain aspects, a portion of the lithium may be disposed in the layer 64. For example, the lithium may be bound to the metal oxide.

Pre-lithiation may be performed using a half-cell method, a short circuiting method, or other methods. In the half-cell method, the second electrode precursor 232 is used as an electrode, paired with lithium foil as another electrode, and an electrolyte as described above in conjunction with FIG. 1. A constant current is applied to lithiate the second electrode precursor 232. In the short circuiting method, a piece of lithium foil with controlled thickness is placed onto the second electrode precursor 232. One or more drops of electrolyte may be added between the lithium foil and the second electrode precursor 232. Current is applied to drive the movement of lithium toward the metal of the second electrode precursor 232. In yet another method, the lithium and the aluminum may be placed into direct contact, or indirect contact via copper foil. Current is applied to drive the movement of lithium towards the metal of the second electrode precursor 232. In various aspects, the alloying is substantially uniform. The pre-lithiation process may be controlled to achieve a desired thickness, concentration, concentration gradient, and element distribution within the electrode 60.

In various aspects, forming the electrode 60 further includes forming a lithium concentration gradient in the body 62. In one example, forming the concentration gradient includes lithiating a reaction base at an interface 260 between the body 62 and the layer 64. The reaction base is alloyed to form the lithium-metal alloy, such as $Li_xAl_{1-x}$, at the interface 260. With a consistent electron supply at the interface 260, lithium ions ($Li^+$) may be continually attracted to the reaction base. The lithium-metal alloy formed, such as the $Li_xAl_{1-x}$, may be further alloyed at the interface 260 to create a highest molar ratio of lithium at the interface 260. The method may further include forming a new lithium-metal alloy phases beneath each previous phase (with each subsequent phase being disposed further from the interface 260 and closer to the second surface 224). The foregoing procedure may be controlled by changing a lithiation rate, by way of non-limiting example. In certain aspects, mass diffusion may facilitate formation of the concentration gradient. Mass diffusion can be controlled through various processing parameters, including temperature, pressure, and/or aging, by way of non-limiting example.

In various aspects, such as in a large-scale manufacturing operation, a roll-to-roll process may be used to continuously pre-lithiate an electrode precursor. For example, an electrical potential (e.g., ranging from about 0.05 volts to about 1.5 volts) is applied between the electrode precursor and a lithium metal counter electrode, both of which are embedded into an electrolyte.

At 270, the alternative second electrode precursor 232' is pre-lithiated to form another electrode 60'. The electrode 60' includes the body 62, and layers 64, 64'. The pre-lithiating at 270 may be similar to the pre-lithiating at 240, except that it may be used to form a lithium concentration gradient similar to that of the body 112 of the electrode 110 of FIG. 3.

In various aspects, the method may further include forming an electrochemical cell including the electrode 60 or the electrode 60'. The electrochemical cell may be similar to the electrochemical cell 140 of FIG. 4. Forming the electrochemical cell may include methods known to those skilled in the art.

Example 1

Figure 8A:
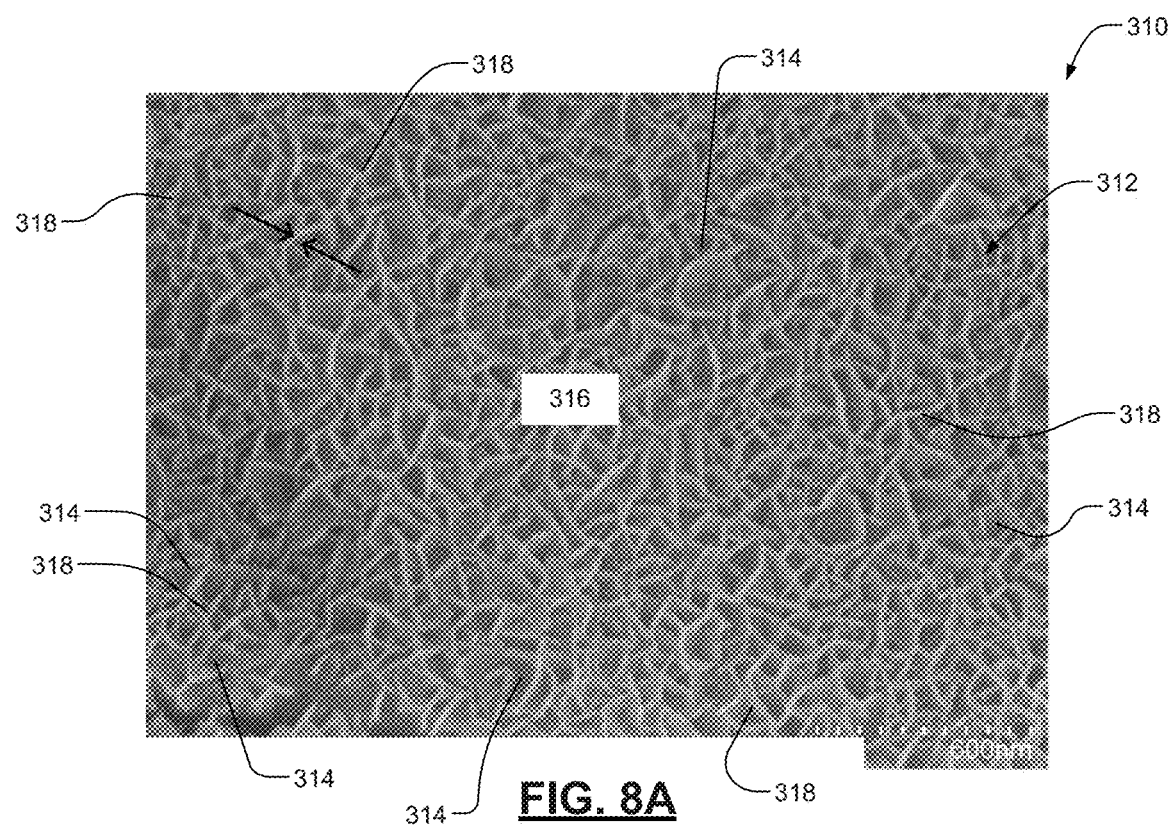
FIGS. 8A-8B are scanning electron microscope (SEM) images of a surface of an electrode precursor according to various aspects of the present disclosure.
Figure 8B:
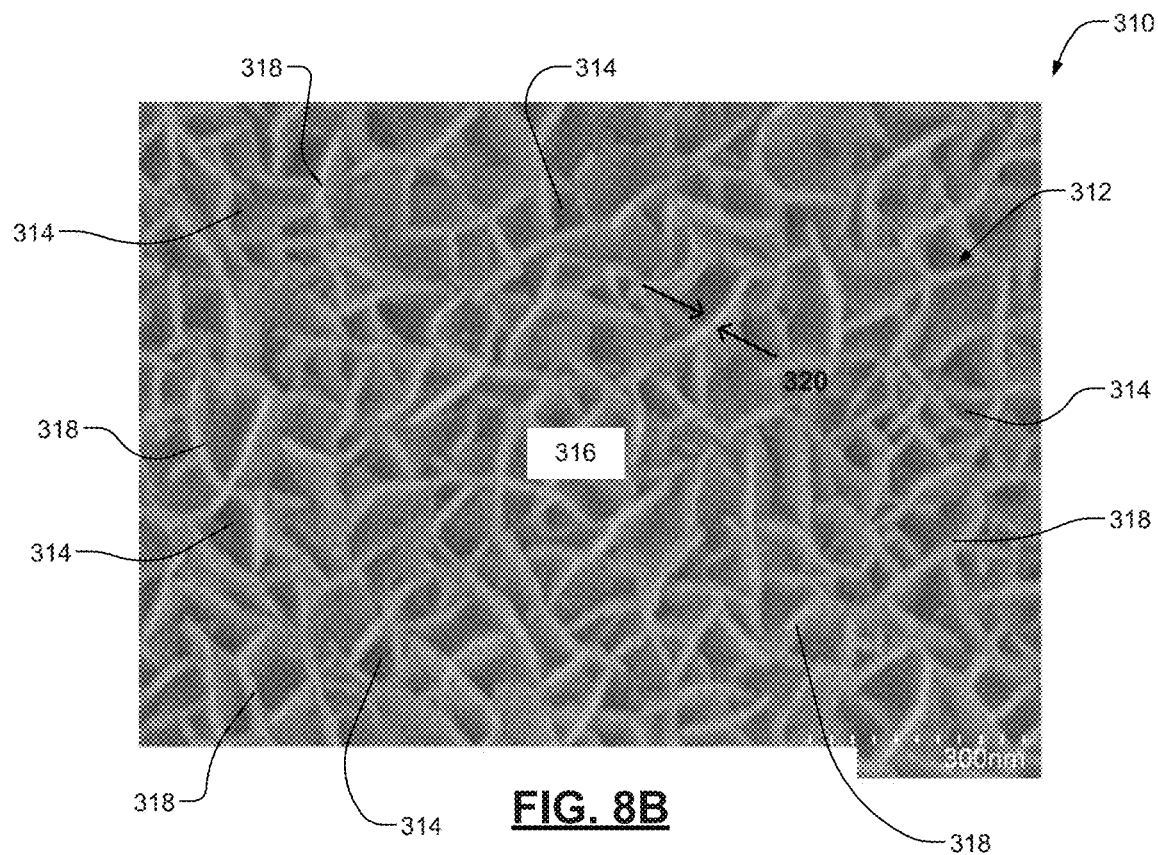

With reference to FIGS. 8A-8B, a second electrode precursor 310 according to various aspects of the present disclosure is provided. The second electrode precursor 310 includes a layer precursor 312. The layer 312 includes anodic aluminum oxide and is substantially free of lithium. The layer defines a plurality of pores 314. At least a portion of the pores 314 extend through an entire thickness of the layer precursor 312 to a body (not shown). A surface 316 of the layer precursor 312 may include a plurality of structures 318 having a first average dimension 320 (FIG. 8B). The pores 314 may be disposed between the structures 318 and surrounded by structures 318.

Figure 9A:
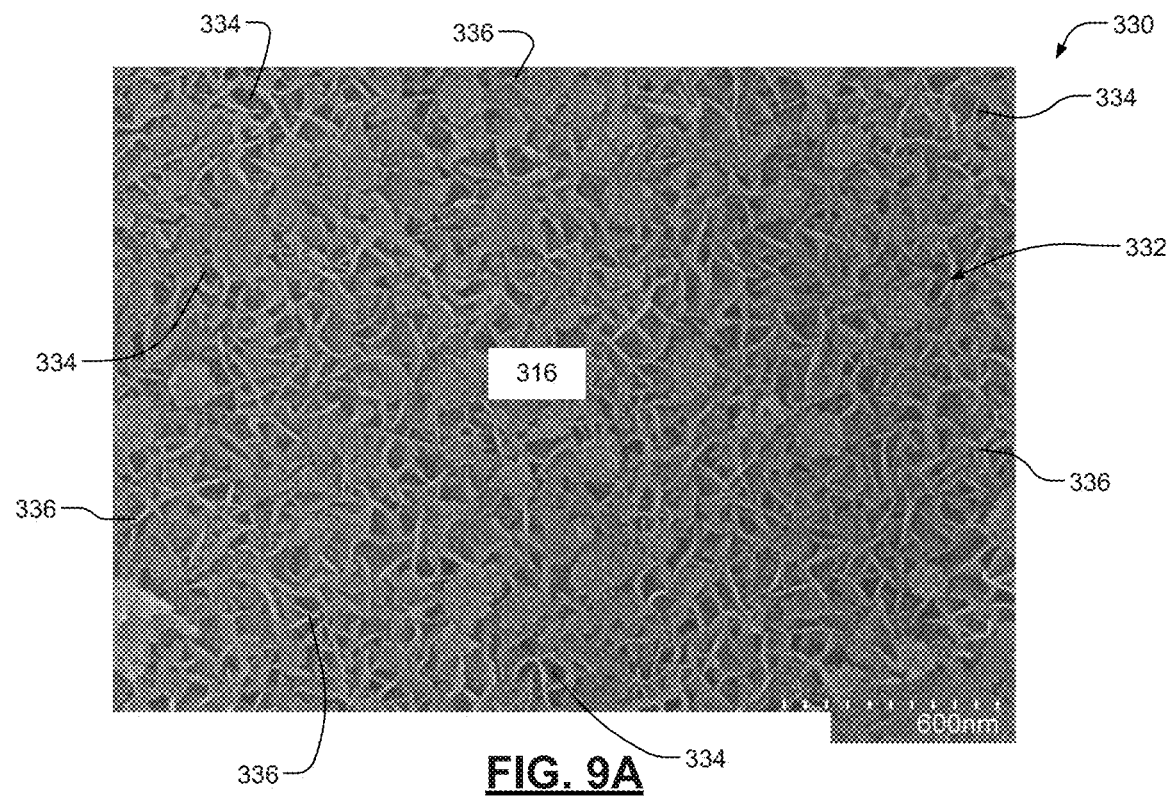
FIGS. 9A-9B are SEM images of a surface of an electrode according to various aspects of the present disclosure.
Figure 9B:
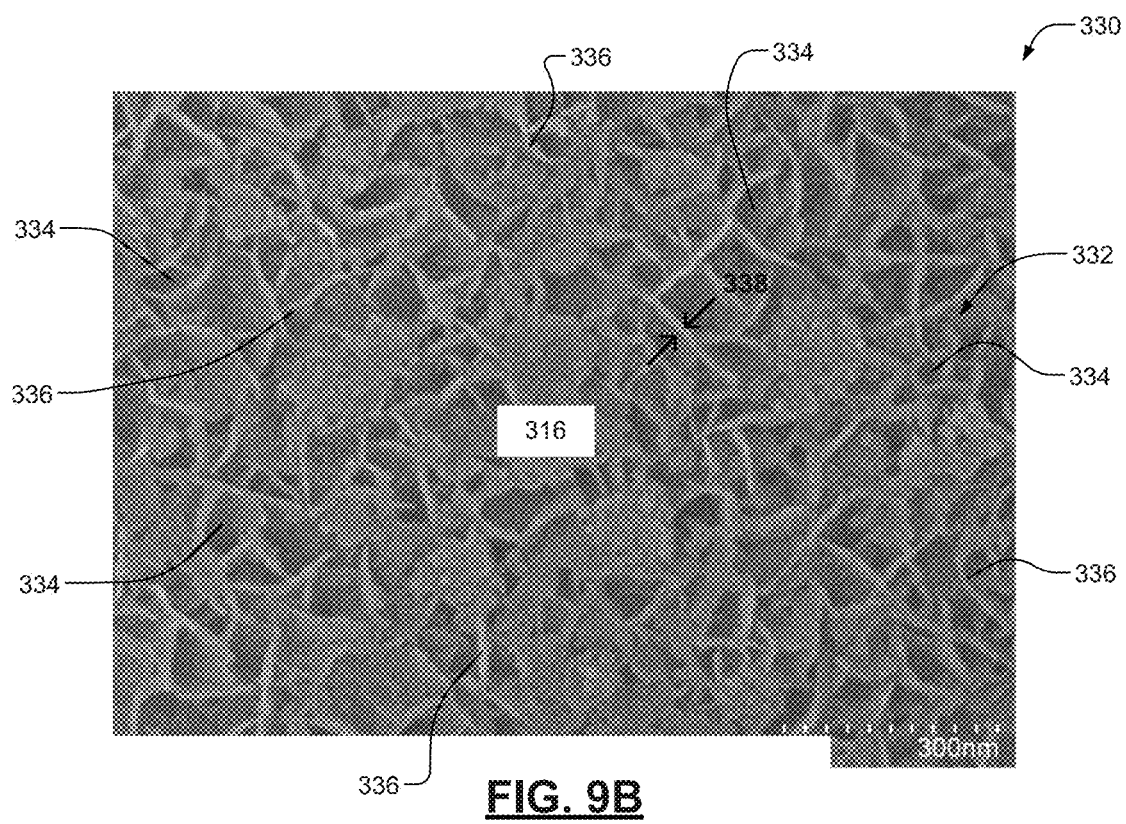

Referring to FIGS. 9A-9B, an electrode 330 according to various aspects of the present disclosure is provided. The electrode 330 is formed from the second electrode precursor 310 of FIGS. 8A-8B. More particularly, the electrode 330 is formed by pre-lithiating the second electrode precursor 310 of FIGS. 8A-8B, such as according to the method of FIG. 7.

The electrode 330 includes a layer 332 and a body (not shown). The layer 332 is formed from the layer precursor 312. Thus, the layer 332 includes a plurality of pores 334 formed from the plurality of pores 314 and a plurality of structures 336 formed from the plurality of structures 318. At least a portion of the pores 334 extend through an entire thickness of the layer 332 to the body. The structures 336 define a second average dimension 338 (FIG. 9B).

During pre-lithiation, lithium is not plated onto the surface 316, but rather, is alloyed with aluminum in the body, as indicated by the similar surface morphologies in FIGS. 8A-9B. In various aspects, the body may have a specific capacity of about 4 mAh/cm² and a thickness of greater than about 20 microns. A portion of the lithium may also bond with the anodic aluminum oxide of the layer precursor 312 to form a lithium-metal-oxide, such as lithium aluminate ($LiAlO_2$). Accordingly, due to the addition of the lithium in the layer 332, the second average dimension 338 may be greater than the first average dimension 320. The layer 332 retains the high surface area of the layer precursor 312 during pre-lithiation, as defined by the pores 334 and structures 336. The high surface area of the layer 332 may desirably facilitate contact between an electrolyte and the body (e.g., through the pores 334).

Example 2

Three coin cells are formed. Each coin cell includes a positive electrode having NMC-622 as a positive electroactive material and an electrolyte including 1M $LiPF_6$ in EC-DEC with 10% FEC by weight. The three coin cells are free of negative electrode current collectors.

A first coin cell includes a first negative electrode. The first negative electrode includes aluminum as the negative electroactive material. The first negative electrode is free of a metal-oxide layer and is not pre-lithiated. Thus, the first coin cell may be referred to as a "first electrode precursor," and may be similar to the first electrode precursor 220 of FIG. 7. A second coin cell includes a second negative electrode.

The second negative electrode includes a body having aluminum as a negative electroactive material, and a layer including anodic aluminum oxide. The second negative electrode is not pre-lithiated. Both the body and the layer are substantially free of lithium. Thus, the second coin cell may be referred to as a "third electrode precursor," and may be similar to the third electrode precursor 232 of FIG. 7.

A third coin cell includes a third negative electrode. The third negative electrode includes a body having a lithium-aluminum alloy as the negative electroactive material, and a layer including anodic aluminum oxide and lithium. Thus, the third coin cell may be similar to the electrode 60 of FIG. 2.

Figure 10:
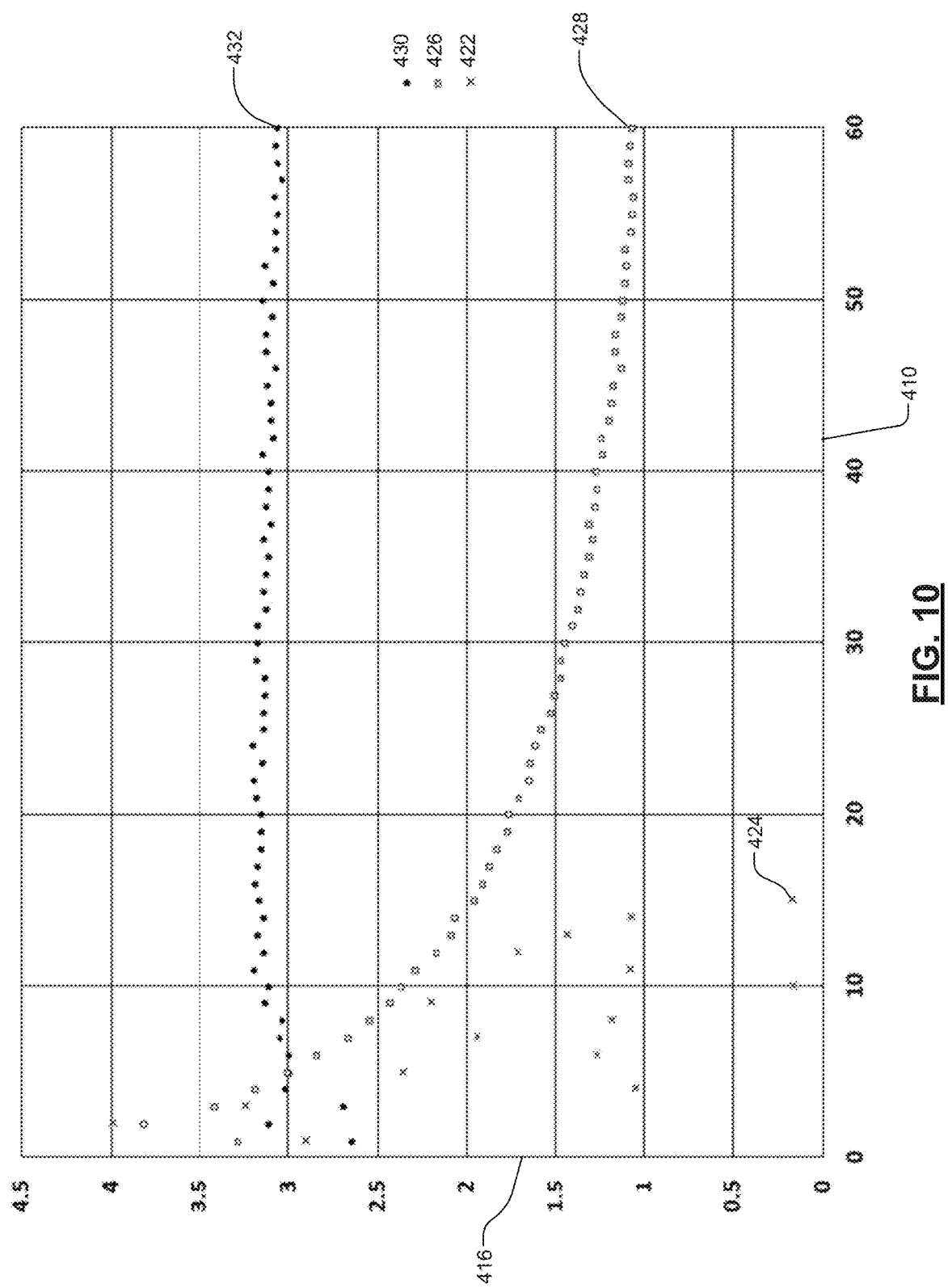
FIG. 10 is a graph depicting specific capacities of first, second, and third coin cells according to various aspects of the present disclosure.

The coin cells are cycled at a rate of C/10 for two formation cycles. With reference to FIG. 10, an x-axis 410 represents cycle number and a y-axis 416 represents discharge capacity in mAh/cm².

Discharge capacity of the first coin cell is shown at 422. The first coin cell has no capacity after 15 cycles, as shown at 424. It is believed that the capacity loss is due to mechanical degradation of the first electrode. Mechanical degradation may occur due to pulverization resulting from large volume changes during cycling when the lithium alloys with the aluminum.

Discharge capacity of the second coin cell is shown at 426. The second coin cell has capacity through at least 60 cycles, as indicated at 428. The second coin cell discharge capacity 426 indicates that the layer may reduce or prevent mechanical degradation, thereby increasing cycle life of the second coin cell when compared to the first coin cell.

Discharge capacity of the third coin cell is shown at 430. After 60 cycles, as shown at 432, the third coin cell still has a discharge capacity of greater than about 3 mAh/cm². The third coin cell discharge capacity 430 indicates that the pre-lithiation may increase the life of the third coin cell compared to the first and second coin cells. It is believed that the lithium reservoir in the third negative electrode and/or the reduction or prevention of mechanical degradation facilitate the increase in cycle life compared to the first and second coin cells. After about 10 cycles, the third coin cell discharge capacity 430 is greater than the first coin cell discharge capacity 422 and the second coin cell discharge capacity 426. Furthermore, the third coin cell shown almost no capacity loss about 60 cycles.

Figure 11:
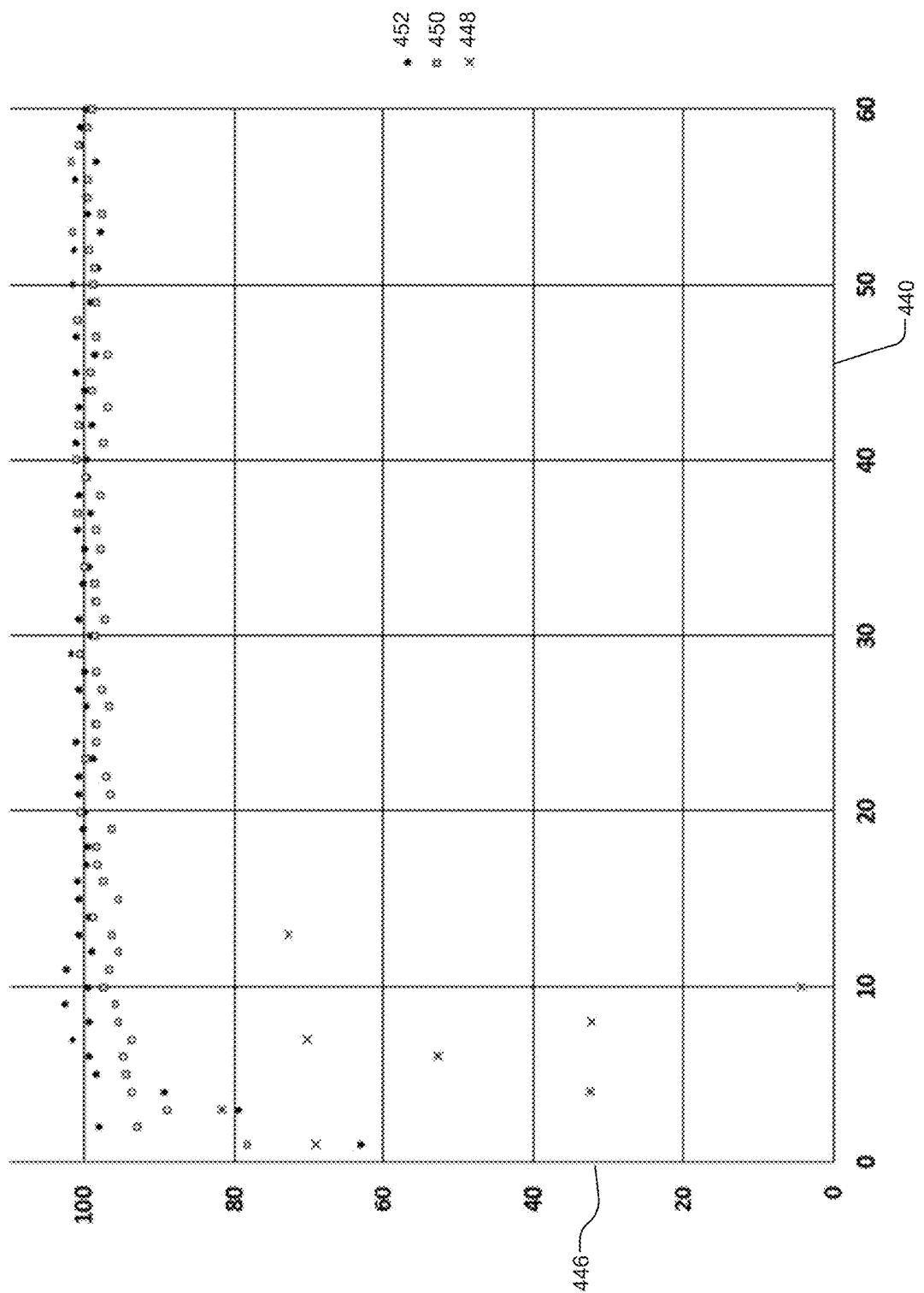
FIG. 11 is a graph depicting the cycle efficiencies of the first, second, and third coin cells of FIG. 10.

With reference to FIG. 11, an x-axis 440 represents cycle number and a y-axis 446 represents Coulombic efficiency. Coulombic efficiency of the first coin cell is shown at 448. The first coin cell Coulombic efficiency 448 jumps around between about 30% and about 80%. Coulombic efficiency of the second coin cell is shown at 450. The second coin cell Coulombic efficiency 450 is generally greater than about 90%. Coulombic efficiency of the third coin cell is shown at 452. The third coin cell Coulombic efficiency 452 is nearly 100% after 60 cycles. Pre-lithiation is believed to facilitate the high third coin cell Coulombic efficiency 452.

Example 3

A coin cell similar to the third coin cell of FIGS. 10-11 is prepared. For a first portion of testing, the coin cell is cycled at C/10 charge and C/5 discharge for 8 cycles. The first portion of testing may be described as low rate testing. For a second portion of testing, the coin cell is cycled at C/3.

Figure 12:
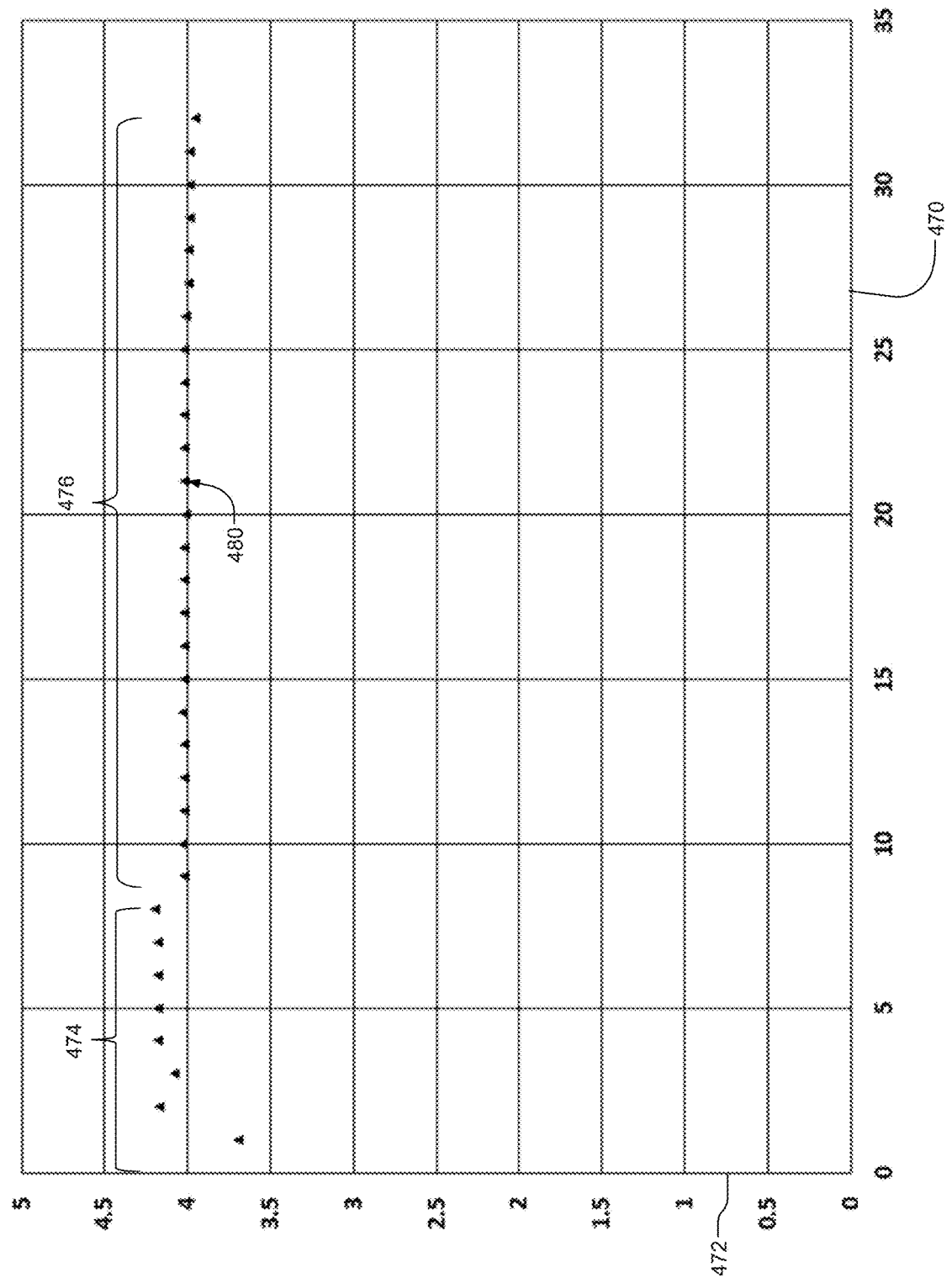
FIG. 12 is a graph depicting a charge capacity and a discharge capacity of a coin cell according to various aspects of the present disclosure.

With reference to FIG. 12, an x-axis 470 represents cycle number and a y-axis 472 represents specific capacity in mAh/cm$^2$. The first portion of testing is shown at 474 and the second portion of testing is shown at 476. Discharge capacity is shown at 480. The coin cell exhibits only minimal capacity drop between the first and second portions 474, 476 of testing. Furthermore, the coin cell demonstrates a high rate capability since there is no significant reduction of capacity when the rate changes from C/10 to C/5. The ionic conductivity and high surface area of the layer are believed to contribute to the high rate capability.

Figure 13:
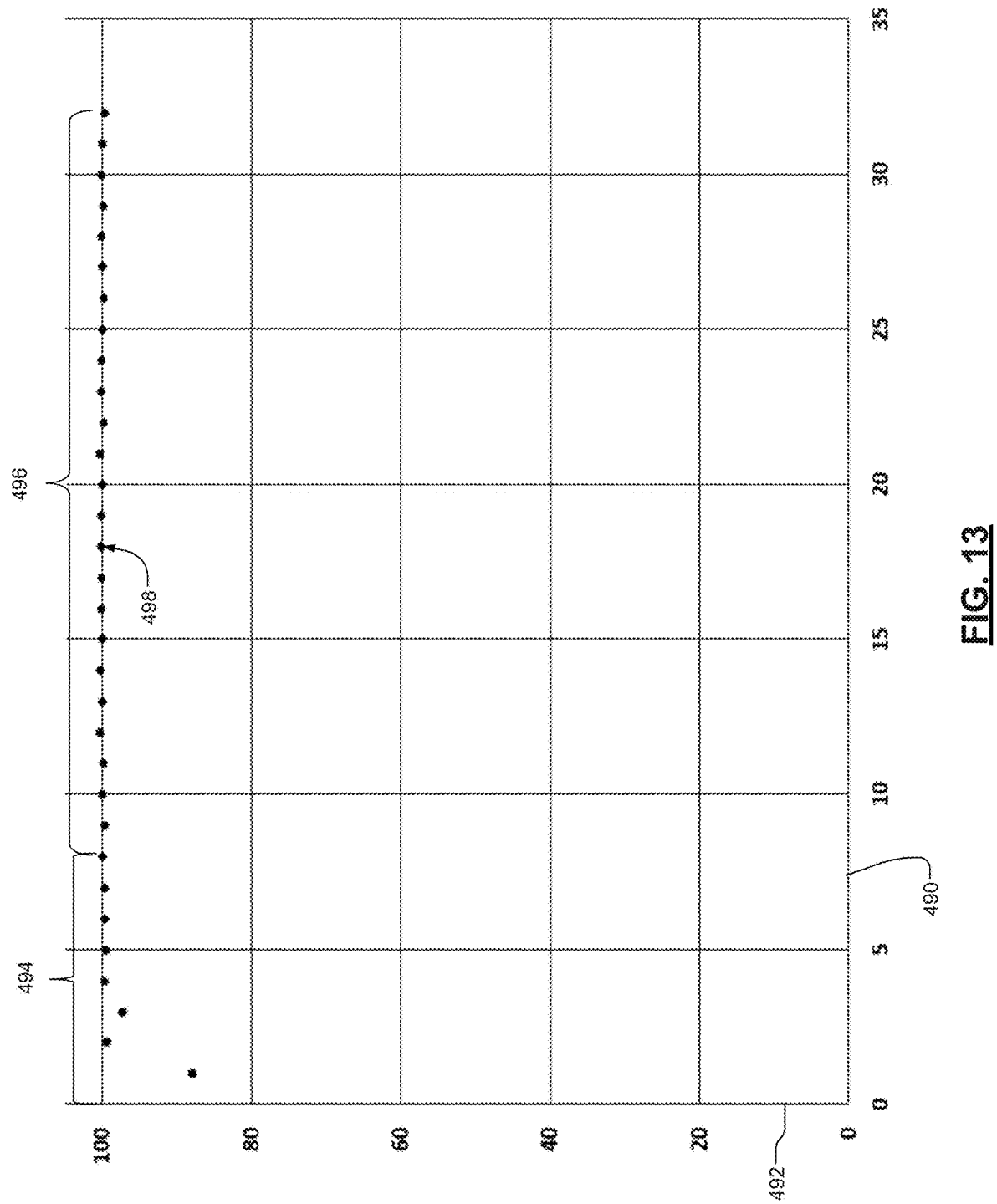
FIG. 13 is a graph depicting Coulombic efficiency of the coin cell of FIG. 12.

Referring to FIG. 13, an x-axis 490 represents cycle number and a y-axis 492 represents Coulombic efficiency. The first portion of testing is indicated by 494 and the second portion of testing is indicated by 496. Coulombic efficiency of the coin cell is shown at 498. The coin Coulombic efficiency 498 is nearly 100% after 32 cycles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A negative electrode comprising:
a negative electroactive material comprising a lithium-aluminum alloy and defining a body; and
a layer disposed directly on at least a portion of the negative electroactive material and coupled to the negative electroactive material, the layer comprising anodic aluminum oxide and a plurality of pores, wherein the layer comprises a first layer disposed on a first side of the body and a second layer disposed on a second side of the body opposite the first side of the body.

2. The negative electrode of claim 1, wherein the body defines a lithium concentration gradient such that a highest molar concentration of lithium is disposed in region of the body adjacent to the layer.

3. The negative electrode of claim 1, wherein the body consists essentially of the lithium-aluminum alloy, lithium, aluminum, and an electrolyte.

4. The negative electrode of claim 1, wherein
the layer has a porosity of greater than or equal to about 20% to less than or equal to about 50%; and
the body has a porosity of less than or equal to about 15%.

5. The negative electrode of claim 1, wherein:
each of the first layer and the second layer have a thickness of less than or equal to about 10 microns; and
at least a portion of the pores of the plurality of pores extend continuously through the first layer and the second layer to the negative electroactive material.

6. The negative electrode of claim 1, wherein the layer further comprises lithium.

7. An electrochemical cell comprising:
a positive electrode comprising a positive electroactive material;
a negative electrode comprising,
a negative electroactive material comprising a lithium-aluminum alloy; and
a layer disposed directly on at least a portion of the negative electroactive material and coupled to the negative electroactive material, the layer comprising anodic aluminum oxide, comprising a plurality of pores, and being electrically insulating;
an electrolyte disposed between the positive electrode and the negative electrode such that a portion of the electrolyte is disposed within the plurality of pores of the layer; and
a positive electrode current collector electrically connected to the positive electrode, wherein the negative electroactive material of the negative electrode is configured to function as a negative electrode current collector such that the electrochemical cell is free of a distinct negative electrode current collector component.

8. The electrochemical cell of claim 7, wherein the layer has a thickness of greater than or equal to about 5 microns and is configured to function as a separator such that the electrochemical cell is free of a distinct separator component.

9. The electrochemical cell of claim 7, further comprising a polymeric membrane separator disposed between the positive electrode and the layer of the negative electrode, the polymeric membrane separator being ionically-conductive and electrically-insulating.

10. The electrochemical cell of claim 7, wherein the electrolyte comprises one of:
(i) a salt comprising lithium perchlorate and a non-aqueous solvent;
(ii) a salt comprising lithium bis(fluorosulfonyl)imide, lithium bis(trifluoromethanesulfonyl)imide, or a combination of lithium bis(fluorosulfonyl)imide and lithium bis(trifluoromethanesulfonyl)imide and an aqueous, non-aqueous, or hybrid solvent; or
(iii) a salt comprising lithium hexafluorophosphate and an additive or co-solvent comprising fluoroethylene carbonate.

11. The electrochemical cell of claim 7, wherein the electrolyte is present in the electrochemical cell at greater than or equal to about 10 weight percent to less than or equal to about 12 weight percent.

12. A method of making a negative electrode, the method comprising:

providing an electrode precursor comprising aluminum;

anodizing a first surface on a first side of the electrode precursor to form a first layer, the first layer comprising anodic aluminum oxide and a first plurality of pores;

anodizing a second surface on a second side of the electrode precursor opposite the first side to form a second layer comprising anodic aluminum oxide and a second plurality of pores; and lithiating at least a portion of the metal of the electrode precursor to form a negative electroactive material comprising a lithium-metal alloy, the negative electroactive material defining a body, the first layer and the second layer being disposed directly on at least a portion of the negative electroactive material and coupled to the negative electroactive material.

13. The method of claim 12, wherein the electrode precursor consists essentially of the aluminum.

14. The method of claim 12, wherein the electrode precursor further comprises a lithium-metal alloy.

15. The method of claim 12, further comprising roughening the first surface of the electrode precursor prior to the anodizing the first surface and the anodizing the second surface.

16. The method of claim 12, wherein the anodizing the first surface and the anodizing the second surface include roll-to-roll processing and the lithiating includes roll-to-roll processing.

* * * * *